(12) United States Patent
Merkoulovitch et al.

(10) Patent No.: US 8,204,813 B2
(45) Date of Patent: **\*Jun. 19, 2012**

(54) SYSTEM, METHOD AND FRAMEWORK FOR GENERATING SCENARIOS

(75) Inventors: Leonid Merkoulovitch, Toronto (CA); Yaacov Mutnikas, Toronto (CA); Diane Reynolds, London (GB); Dan Rosen, Toronto (CA)

(73) Assignee: Algorithmics Software LLC, New York, NY (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/547,068

(22) Filed: Aug. 25, 2009

(65) Prior Publication Data

US 2009/0313180 A1    Dec. 17, 2009

Related U.S. Application Data

(63) Continuation of application No. 10/120,795, filed on Apr. 12, 2002, now Pat. No. 7,599,870.

(51) Int. Cl.
*G06Q 40/00* (2012.01)

(52) U.S. Cl. ............... 705/36 R; 705/35; 705/38

(58) Field of Classification Search ........... 705/36 R
See application file for complete search history.

(56) References Cited

U.S. PATENT DOCUMENTS

| | | | |
|---|---|---|---|
| 5,832,456 A | 11/1998 | Fox et al. | |
| 5,864,857 A | 1/1999 | Ohata et al. | |
| 5,884,287 A * | 3/1999 | Edesess | 705/36 R |
| 6,601,233 B1 | 7/2003 | Underwood | |
| 6,606,615 B1 | 8/2003 | Jennings et al. | |
| 6,876,992 B1 | 4/2005 | Sullivan | |
| 7,006,992 B1 * | 2/2006 | Packwood | 705/38 |
| 7,051,036 B2 | 5/2006 | Rosnow et al. | |
| 7,149,715 B2 | 12/2006 | Browne et al. | |

(Continued)

OTHER PUBLICATIONS

"Algo Suite," Algorithmics Incorporated, Jun. 2000.*

(Continued)

*Primary Examiner* — Elizabeth Rosen
*Assistant Examiner* — Joan Goodbody
(74) *Attorney, Agent, or Firm* — Katten Muchin Rosenman LLP

(57) ABSTRACT

System, method and framework for generating scenarios used in risk management applications. The present invention is based on a generic framework that provides levels of abstraction, segregates risk factors and models, and structures a scenario generation process. In one aspect of the present invention, there is provided a framework for scenario generation for use in a risk management application, where the framework defines a plurality of components associated with a scenario set, where each component is represented by at least one of a set of data structures, and where the set of data structures comprises: at least one first data structure defining a group of risk factors with similar statistical properties; at least one second data structure defining the future distribution or evolutionary process of a risk factor in the group of risk factors; a third data structure defining a calibrated model for generating scenarios, where relationships between risk factors of the group of risk factors are defined therein, and where the calibrated model associates each second data structure with a first data structure; and a fourth data structure specifying how the first, second, and third data structures are to apply to a user-specified risk management problem.

9 Claims, 10 Drawing Sheets

U.S. PATENT DOCUMENTS

| | | | |
|---|---|---|---|
| 7,171,385 | B1 | 1/2007 | Dembo et al. |
| 7,392,213 | B2 | 6/2008 | Merkoulovitch et al. |
| 7,395,236 | B2 | 7/2008 | Degraaf et al. |
| 7,562,040 | B2 * | 7/2009 | Loeper .................. 705/36 R |
| 2001/0011243 | A1 | 8/2001 | Dembo et al. |
| 2001/0025264 | A1 | 9/2001 | Deaddio et al. |
| 2001/0056398 | A1 | 12/2001 | Scheirer |
| 2002/0103747 | A1 * | 8/2002 | Lawrence .................. 705/38 |
| 2002/0111890 | A1 | 8/2002 | Sloan et al. |
| 2002/0138407 | A1 * | 9/2002 | Lawrence et al. ............ 705/38 |
| 2002/0147671 | A1 * | 10/2002 | Sloan et al. .................. 705/36 |
| 2002/0165841 | A1 | 11/2002 | Quaile |
| 2002/0188496 | A1 | 12/2002 | Feldman et al. |
| 2003/0014355 | A1 | 1/2003 | Browne et al. |
| 2003/0014356 | A1 | 1/2003 | Browne et al. |
| 2003/0018456 | A1 | 1/2003 | Browne et al. |
| 2003/0055664 | A1 | 3/2003 | Suri |
| 2003/0101122 | A1 * | 5/2003 | Merkoulovitch et al. ....... 705/36 |
| 2003/0125965 | A1 | 7/2003 | Falso et al. |
| 2003/0135450 | A1 | 7/2003 | Aguais et al. |
| 2004/0024693 | A1 | 2/2004 | Lawrence |
| 2004/0215545 | A1 | 10/2004 | Murakami et al. |
| 2004/0215551 | A1 | 10/2004 | Eder |
| 2005/0119919 | A1 | 6/2005 | Eder |
| 2008/0027841 | A1 | 1/2008 | Eder |

OTHER PUBLICATIONS

Ron Dembo et al. "Mark to future: A framework for measuring risk and reward," Algorithmics Publications, May 2000.*

R. S. Dembo, A. R. Aziz, D. Rosen, and M. Zerbs, "Mark to Future a Framework for Measuring Risk and Reward", May 2000, Algorithmic Publication.

"Algo Suite", pp. 1-32, 2000.

Dale Walter Karolak, "Software Engineering Risk Management finding Your Path Through the Jungle, Version 1.0", 1998, pp. 1-162, plus 12 cover pages, total of 174 pages.

Reimers, Mark and ZER8, S Michael. "A Multi-factor Statistical Model for Interest Rates". Algo Research Quarterly, vol. 2. No. 3, Sep. 1999. p. 53-63.

R. S. Dembo, A. R. Aziz, D. Rosen, and M. Zerbs, "Mark to Future a Framework for Measuring Risk and Reward", May 2000, pp. 1089 and 8 extra pages.

R. S. Dembo, A. R. Aziz, D. Rosen, and M. Zerbs, "Step 1: Defining Scenarios and Time Steps" Mark to Future a Framework for Measuring Risk and Reward, Toronto Algorithmics Incorporated, May 2000, pp. 7-32.

Diane Reynolds, "A Framework for Scenario Generation", Algo Research Quarterly, vol. 4, No. 3, Sep. 2001, pp. 15-35.

* cited by examiner

SYSTEM, METHOD AND FRAMEWORK FOR GENERATING SCENARIOS

This application is a continuation of U.S. patent application Ser. No. 10/120,795, filed Apr. 12, 2002, the contents of which is incorporated herein by reference.

FIELD OF THE INVENTION

The present invention relates generally to risk management systems and methods, and is more specifically directed to a system, method and framework for generating scenarios used in risk management applications.

BACKGROUND OF THE INVENTION

In order for an organization to effectively manage risk at an enterprise-wide level, a risk management system that can apply methodologies able to integrate the various risks faced by the organization should be used. To be most effective, the system must be capable of integrating risks spanning multiple business units and geographical locations.

As risk measures and their underlying models grow more complex, many risk managers are relying more on scenario-based methods. In these methods, future uncertainty is represented in terms of a set of scenarios, where each scenario represents a possible future economic situation. Accordingly, a scenario set consists of one or more scenarios, and is often interpreted as a set of possible future situations.

Mark-to-Future™ (MtF) is an example of a scenario-based approach that measures and manages a variety of risks. An example of an implementation of this methodology and why it represents a standard for simulation-based risk management can be found in pending U.S. patent application Ser. No. 09/811,684, the contents of which are herein incorporated by reference. MtF provides flexibility in the definition of scenarios of interest, sets of financial instruments, portfolio hierarchies, and risk measures. The elements must be defined in a coordinated manner to ensure a sensible result.

Consider, for example, using MtF to estimate the Value-at-Risk (VaR), based on historical data, of a large, diverse, portfolio. Given the instruments in the portfolio and their respective pricing models, it is first necessary to identify a set of underlying risk factors for the portfolio. A risk factor is any observable economic variable whose value, or change in value, may be translated into a change in the value of a portfolio under consideration. The set of all risk factors and their values determines a "state of the world" and provides an economic snapshot under which the portfolio under consideration may be evaluated during a simulation. These risk factors might include, for example, interest rates, foreign exchange rates, commodity prices, equity prices, market indices, credit spread curves, implied volatilities, and macroeconomic factors.

Once historical time series data for all risk factors have been obtained, the data can be manipulated to produce a consistent set of scenarios. A scenario set is a list of risk factors and their values at one or more points in the future that completely define an economic situation. These scenarios, once produced, act as input to the pricing models, which calculate scenario-dependent prices for all instruments. By combining the resulting prices with the number of units of a particular instrument held in a portfolio or alternatively the "portfolio position information", a profit-and-loss distribution for the portfolio can be obtained, from which the VaR can be estimated.

Scenarios are the basis of risk measurement in MtF. The more precisely the scenarios span the set of possible future events, the more accurate the risk measures calculated from the scenarios will be. The ability to obtain more accurate risk measures allows for more effective risk management.

Since many risk measures (e.g. VaR) are of a statistical nature, generating statistical scenarios is an important part of MtF, or any other simulation-based methodology. Statistical scenarios are created by assuming that risk factors behave according to specific models, and then these models are used to generate possible future outcomes. The models may range, for example, from simple historical approaches, which assume that previous risk factor changes recur in the future, to complex jump diffusion processes. A common feature is that a large number of scenarios are created and assumed to represent the set of all possible future events.

Statistical or model-based scenarios are only as good as the models used. Often the models are too simple to capture the complex interactions of global financial markets. Therefore, risk management practitioners use in addition, non-statistical scenarios such as "worst-case scenarios", "stress scenarios", and "sensitivity scenarios" to account for some of the deficiencies of model-based statistical scenarios. Accordingly, there is a need for a system for creating and handling different types of scenarios, including both statistical scenarios and non-statistical scenarios.

Risk management has progressed from measuring market, credit, liquidity and other risks in isolation, to measuring them jointly, and taking into account correlation and diversification effects. Proper joint measures require the definition of scenarios covering the set of all risk factors, and complete descriptions of the relationships among risk factors. In this way, a consistent view of the future can be produced, leading to consistent measurement of different types of risk.

Although the task of defining scenarios in this manner may appear to be simple (i.e. take all of the risk factors, estimate their inter-relationships and generate scenarios), practical problems typically arise.

Consider the joint measurement of market and credit risk, for example. The set of risk factors typically number in the thousands, while the number of counterparties often reaches the tens of thousands. As a result, the combined set of risk factors can quickly become unmanageable. Furthermore, the essential properties of the risk factors, such as historical trends, reporting frequencies and future expectations, may also differ substantially. Accurately representing the evolution of risk factors may therefore involve a wide range of statistical methods.

A large number of risk factors with different properties complicates the task of generating statistical scenarios. The dynamic nature of scenario generation processes presents a further challenge, namely, the system that produces scenarios needs to be flexible and extensible. As risk management expands in scope, new risk factors are continually introduced. Adding these risk factors to existing scenarios can be difficult, and often requires changes throughout the scenario generation process. For example, adding a new risk factor that is non-normally distributed to a set that is normal requires not only a new model, but also the definition of how this risk factor interacts with every existing risk factor. This cannot be handled by simply adding to an existing variance-covariance matrix or even re-calculating the matrix; the addition of a new codependent structure is typically required.

Furthermore, new models for generating scenarios appear in the risk management and finance literature frequently. Some are extensive, dealing jointly with a variety of risk factors, while others focus on marginal distributions of a single risk factor. Ideally, when a new marginal model (i.e. a model that focus on marginal distributions of a single risk factor) can be applied to a particular type of risk factor, it should be possible to simply substitute it for the existing model without affecting other risk factors included in the scenarios. However, scenario-based risk management systems that exist in the prior art are generally not equipped with this capability. Similarly, if a new joint model (i.e. a model that deal jointly with a variety of risk factors) is proposed in the literature, it is more convenient to reuse as much of an existing model and its implementation as possible than to undertake major changes to the existing scenario generation process for risk management.

It is important that the nature of a scenario set can be communicated to different audiences (e.g. senior management, a Board of Directors, auditors, traders, or other risk management personnel). However, while senior management may prefer a very high-level, non-technical description, in contrast, those who implement and maintain the scenario set need a thorough understanding of all technical details. For example, the phrase "a multi-step Monte Carlo scenario set in which the interest rates mean revert and the equities grow, over time" may sufficiently describe a scenario set for managerial purposes. In contrast, the actual generation of this scenario set may require a more detailed specification, for example: "a multi-step quasi Monte Carlo method using an equally weighted variance-covariance (VCV) matrix for Canadian, American and Australian interest rates where each curve is represented by three components that mean revert, and American equities, adjusted for stock splits that grow over time."

The second description above indicates, to some extent, the complexity of the models and risk factor relationships that typically underlie statistical scenarios. Explaining or understanding statistical scenario generation at a detailed level is often difficult for two main reasons. First, the models for individual risk factors and their joint behaviour are typically combined into one single, large model, making it hard to isolate their respective properties. Second, the calibration of this model is usually done in one long and involved process.

Accordingly, there is a need for a generic, structured framework for generating scenarios consistently, and that allows for scenario sets to be communicated to a number of different audiences in a simplified way.

SUMMARY OF THE INVENTION

The present invention relates generally to risk management systems and methods, and is more specifically directed to a system, method and framework for generating scenarios used in risk management applications.

The present invention is based on a generic framework that provides levels of abstraction, segregates risk factors and models, and generally, structures the overall scenario generation process. The framework breaks the process into a series of components, each comprising a small, manageable set of related decisions, which can then be explained and understood more easily. By combining components, complex scenario sets can be constructed in a piece-wise fashion, rather than by trying to tackle the scenario generation problem as a whole. This decomposition has other advantages as well. For example, separating the individual behaviour of the risk factors from their joint characteristics increases the flexibility in assigning models to the risk factors. The framework also divides naturally into several levels of abstraction, which facilitates the communication of scenario-related information. The component-based, logical flow of the framework allows for easy extensibility, additional flexibility, and efficient re-use of existing models and methods.

In one aspect of the present invention, there is provided a framework for scenario generation for use in a risk management application, where the framework defines a plurality of components associated with a scenario set, where each component is represented by at least one of a set of data structures, and where the set of data structures comprises: at least one first data structure defining a group of risk factors with similar statistical properties; at least one second data structure defining the future distribution or evolutionary process of a risk factor in the group of risk factors; a third data structure defining a calibrated model for generating scenarios, where relationships between risk factors of the group of risk factors are defined therein, and where the calibrated model associates each second data structure with a first data structure; and a fourth data structure specifying how the first, second, and third data structures are to apply to a user-specified risk management problem.

In another aspect of the present invention, there is provided a method of scenario generation for use in a risk management application, comprising the steps of: defining at least one group of risk factors, where the risk factors of each group have similar statistical properties; defining at least one future distribution or evolutionary process for at least one group of risk factors; defining a calibrated model for generating scenarios, where the calibrated model associates each future distribution or evolutionary process with a risk factor in the group of risk factors; defining the relationships between the risk factors in the group of risk factors; and specifying how the calibrated model is to apply to a user-specified risk management problem.

In another aspect of the present invention, there is provided a process of generating scenarios through a simulation, for use in a risk management application, comprising the steps of: creating one or more Blocks by grouping one or more risk factors that affect a portfolio under consideration; creating one or more Models, where each Model specifies a simulation model and estimation methods to be used in the simulation; building a Scenario Generator in which each Model is associated with at least one Block; specifying a sampling method; and creating a scenario set by sampling random numbers according to the sampling method to define how the one or more risk factors will evolve in the future.

In another aspect of the present invention, there is provided a system for generating scenarios for use in a risk management application, the system comprising: a scenario engine for generating scenario sets; a scenario builder graphical user interface coupled to the scenario engine for receiving user input and receiving scenario engine output, where the scenario engine output includes scenario set definitions and generated scenario sets; and at least one database connected to the scenario engine, where time series data is stored in the at least one database; wherein the scenario engine generates scenario sets according to a calibrated model that identifies how scenario sets are to be generated for a user-defined risk management problem.

BRIEF DESCRIPTION OF THE DRAWINGS

For a better understanding of the present invention, and to show more clearly how it may be carried into effect, reference will now be made, by way of example, to the accompanying drawings in which.

DETAILED DESCRIPTION OF THE PREFERRED EMBODIMENTS

The present invention relates generally to risk management systems and methods, and is more specifically directed to a system, method and framework for generating scenarios used in risk management applications.

According to one aspect of the present invention, there is provided a framework for generating statistical scenarios. In an embodiment of the present invention, the process of generating statistical scenarios in accordance with this framework is based on the answers to five key questions. The answers are used to decompose the process into a series of identifiable, reusable and self-contained components within the scenario generation framework. The framework allows the thought process and goals of a risk manager to be related directly to the scenario generation process.

The framework addresses some of the most significant issues in scenario generation: varied audiences need information about scenarios, models are inherently complex, new models need to be incorporated as they emerge, and large numbers of risk factors must be managed. To deal with these issues, the framework provides several levels or layers of abstraction, a modular structure, a separation of risk factors and models, and a separation of the joint and marginal distributions. The strengths of the framework include its flexibility, extensibility and usefulness in explaining large-scale scenario generation processes clearly and concisely.

In preferred embodiments of the present invention, the scenario generation framework is embodied in a scenario engine. The Algo Scenario Engine™ (ASE) developed by the assignee of the present invention is one example of an implementation of such a scenario engine. ASE is an advanced scenario generating application that is an important part of the MtF framework, in that ASE produces the scenarios that serve as a core input to the MtF framework. A summary of this MtF framework and the underlying methodology is provided in the section below. Further details on the MtF framework can also be found in a publication published by the assignee of the present invention entitled Dembo et al., *mark to future: A Framework for Measuring Risk and Reward*, (Toronto: Algorithmics Incorporated, 2000), the contents of which are herein incorporated by reference.

Mark-to-Future Methodology

At the core of the MtF framework is the generation of a three-dimensional MtF Cube. The MtF Cube is built in steps.

Figure 1:
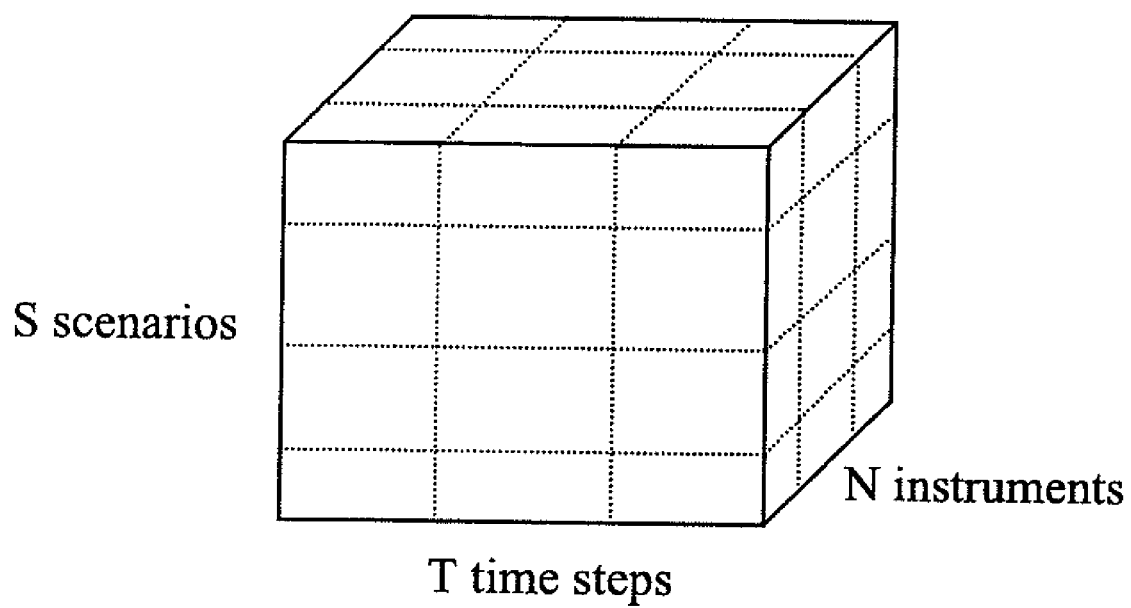
FIG. 1 is a diagram illustrating a Mark-to-Future (MtF) cube.

First, a set of scenarios is chosen. In the second step, a MtF table is generated for a given financial instrument. Each cell of the MtF table contains the computed MtF value for that financial instrument under a given scenario at a specified time step. A MtF Cube consists of a set of MtF tables, one for each financial instrument of interest. FIG. 1 illustrates an example of an MtF Cube, shown conceptually, and referred to generally as 10.

In certain applications, a cell of the MtF Cube may contain other measures in addition to its MtF value, such as an instrument's MtF delta or MtF duration. In the general case, each cell of a MtF Cube contains a vector of risk factor-dependent measures for a given instrument under a given scenario and time step. In some applications, the vector may also contain a set of risk factor-dependent MtF cash flows for each scenario and time step.

A key to the MtF framework is the premise that a knowledge of portfolio holdings is not required to generate a MtF Cube: a single MtF Cube accommodates the risk and reward assessment of multiple portfolios simultaneously. A MtF Cube provides a pre-computed basis that maps into all portfolios of financial products. Since the MtF Cube contains all of the necessary information about the values of individual instruments, a portfolio MtF table can be created simply as a combination of those basis instruments. All risk and reward analyses and portfolio dynamics for any set of holdings are, therefore, derived by post-processing the contents of the MtF Cube. For example, the risk and reward assessment of a portfolio regime such as a roll-over strategy or an immunization strategy is captured strictly through the mapping of the MtF Cube into dynamically rebalanced positions.

The MtF methodology for risk and reward assessment can be summarized in six steps, each of which can be explicitly configured as an independent component of the overall process:

The first three steps build the MtF Cube:
1. Define the scenario paths and time steps.
2. Define the basis instruments.
3. Simulate the instruments over scenarios and time steps to generate a MtF Cube.

The next three steps apply the MtF Cube:
4. Map the MtF Cube into portfolios to produce a portfolio MtF table.
5. Aggregate across dimensions of the portfolio MtF table to produce risk/reward measures.
6. Incorporate portfolio MtF tables into advanced applications.

Figure 2:
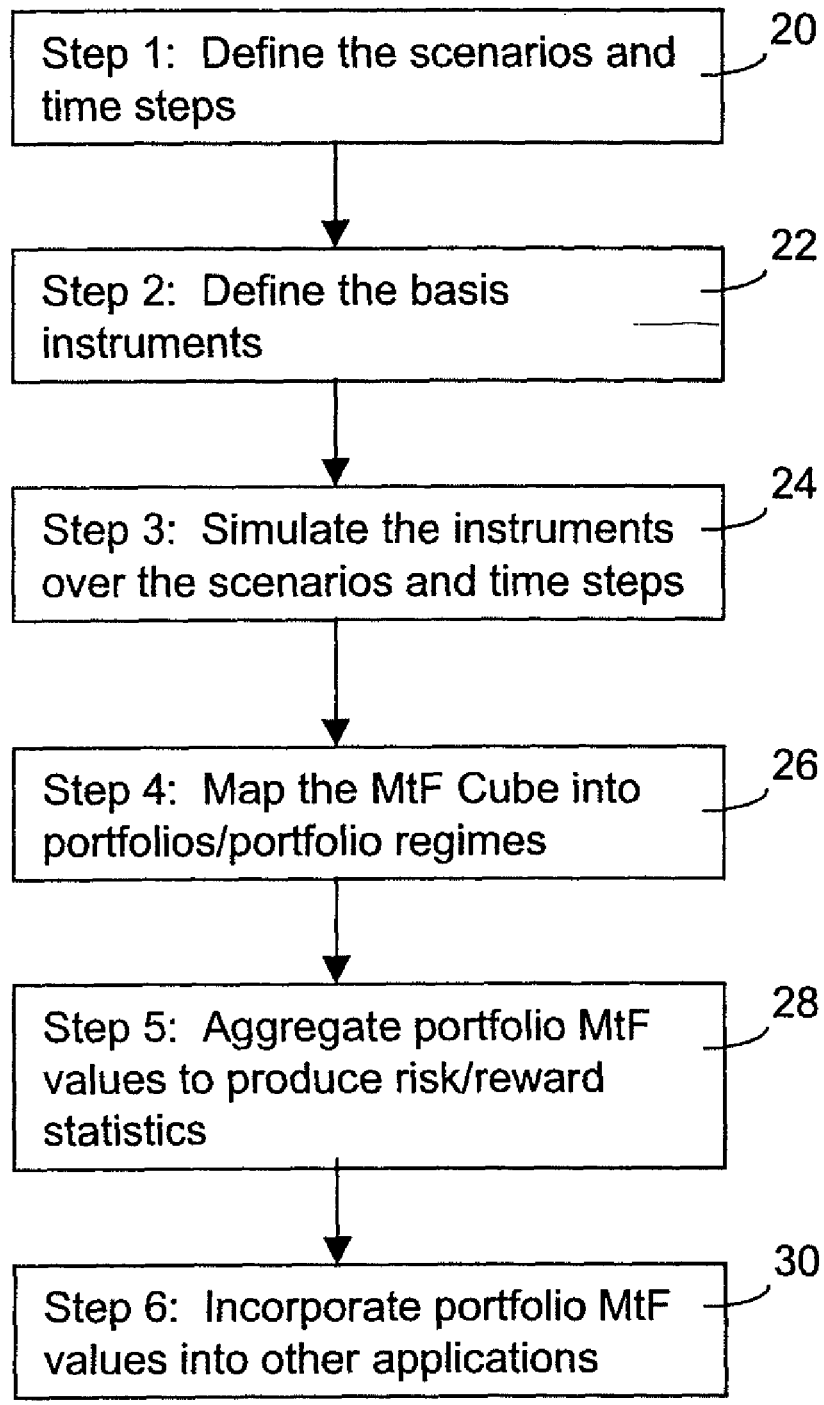
FIG. 2 is a flowchart illustrating the steps in a MtF methodology.

The simulation of the MtF Cube in Steps 1 to 3 represents the most computationally intensive stage of the overall process and, generally, need be performed only once. These steps represent the pre-Cube stage of MtF processing. In contrast, Steps 4 to 6 represent post-processing exercises, which can be performed with minimal additional processing (Step 4 and Step 5) or slightly more complex processing (Step 6). These steps represent the post-Cube stage of MtF processing. FIG. 2 is a flowchart illustrating the six steps of the MtF methodology, explained in further detail below.

Step 1 (Marked as 20 in FIG. 2): The Definition of Scenarios

In the MtF framework, scenarios represent the joint evolution of risk factors through time and are, thus, the ultimate determinant of future uncertainty. The explicit choice of scenarios is the key input to any analysis. Accordingly, scenarios directly determine the future distributions of portfolio MtF values, the dynamics of portfolio strategies, the liquidity in the market and the creditworthiness of counterparties and issuers, for example.

Step 2 (Marked as 22 in FIG. 2): The Definition of Basis Instruments

Portfolios consist of positions in a number of financial products, both exchange traded and over-the-counter (OTC). The MtF Cube is the package of MtF tables, each corresponding to an individual basis instrument. A basis instrument may represent an actual financial product or an abstract instrument. As the number of OTC products is virtually unlimited, it is often possible to reduce substantially the number of basis instruments required by representing the MtF values of OTC products as a function of the MtF values of the abstract instruments.

Step 3 (Marked as 24 in FIG. 2): The Generation of the MtF Cube

The MtF Cube consists of a set of MtF tables each associated with a given basis instrument. The cells of a MtF table contain the MtF values of that basis instrument as simulated over a set of scenarios and a number of time steps. These risk factors, scenario paths and pricing functions are simulated for the MtF values at this stage.

Step 4 (Marked as 26 in FIG. 2): The Mapping of the MtF Cube into Portfolios and Portfolio Strategies From the MtF Cube, multiple portfolio MtF tables can be generated as functions of the MtF tables associated with each basis instrument. Key to the MtF framework is the premise that a MtF Cube is generated independently of portfolio holdings. Any portfolio or portfolio regime can be represented by mapping the MtF Cube into static or dynamically changing portfolio holdings.

Step 5 (Marked as 28 in FIG. 2): The Estimation of Risk/Reward Measures Derived from the Distribution of Portfolio MtF Values The portfolio MtF table resulting from the mapping of the MtF Cube into a given portfolio or portfolio strategy contains a full description of future uncertainty. Each cell of the portfolio MtF table contains a portfolio MtF value for a given scenario and time step. The actual risk and reward measures chosen by a user to characterize this uncertainty can be arbitrarily defined and incorporated strictly as post-processing functionality in the post-Cube stage.

Step 6 (Marked as 30 in FIG. 2): More Advanced Post-Processing Applications using the MtF Cube MtF Cubes may serve as input for applications that perform more complex tasks than calculating simple risk/reward measures. The properties of linearity and conditional independence on each scenario can be used to obtain computationally efficient methodologies. For example, conditional independence within a particular scenario is a powerful tool that allows the MtF framework to effectively incorporate processes such as joint counterparty migration. In addition, portfolio or instrument MtF tables may be used as input to a wide variety of scenario-based risk management and portfolio optimization applications.

The decoupling of the post-Cube stage from the pre-Cube stage is a key architectural benefit of the MtF framework. A single risk management_department or centralized management service may generate a MtF Cube (pre-Cube) that can be distributed to multiple risk clients (post-Cube) for a variety of customized business applications. This process of generating the MtF Cube generates leverage as a common risk and reward framework, and can be widely distributed throughout the organization as well as to external organizations for user-specific analyses.

ASE

ASE produces the scenarios that serve as a core input to the MtF framework. The scenarios created in ASE may be based on historical time series data for observable market rates and prices—what may be referred to as risk factors. Time series data is an excellent source for reasonable event sequences and can be used in model calibration. ASE uses these risk factors to generate scenarios, which are then used for the simulation and stress testing of portfolios. Simulation is the process of evaluating a portfolio using each scenario in a scenario set.

ASE may be considered to be like a "toolbox". All of the components required to generate scenarios are provided in an interactive interface. The adaptable scenario generation framework which underlies ASE provides users with the flexibility to design and construct scenario generators for a variety of needs. The user is able to define the components and assemble them to create a specific set of scenarios. The scenario generation framework allows users to, for example:

a) quickly build a scenario generator using a step-by-step process;

b) mix and match components to create customized generators;

c) reuse previously defined components;

d) efficiently generate scenarios; and e) generate scenario sets using either historical or Monte Carlo methods.

ASE provides access to models for generating Monte Carlo and historical scenario sets, and for creating a variety of user-defined stress scenario sets. The generation models available may include, for example:

i) Historical scenarios with varying time horizons and delta types;

ii) Volatility scaling of historical scenarios;

iii) Lognormal/normal single-step Monte Carlo (MC) scenarios;

iv) Mixture of Normals MC scenarios;

v) Brownian Motion/Geometric Brownian Motion multi-step MC scenarios; vi) Multi-step MC scenarios exhibiting growth or mean reversion;

vii) Principal components analysis;

viii) Calibration of all available models; and ix) Stress scenarios: Conditional scenarios and Sensitivity scenarios.

In accordance with a preferred embodiment of the invention, the core of the ASE application (i.e. the scenario engine) exists as a server. The server is instantiated at implementation and may run indefinitely. The server interface can be designed to be used by other applications to request scenarios directly from the scenario engine. Requested information can then be sent to the requesting application directly.

Figure 3:
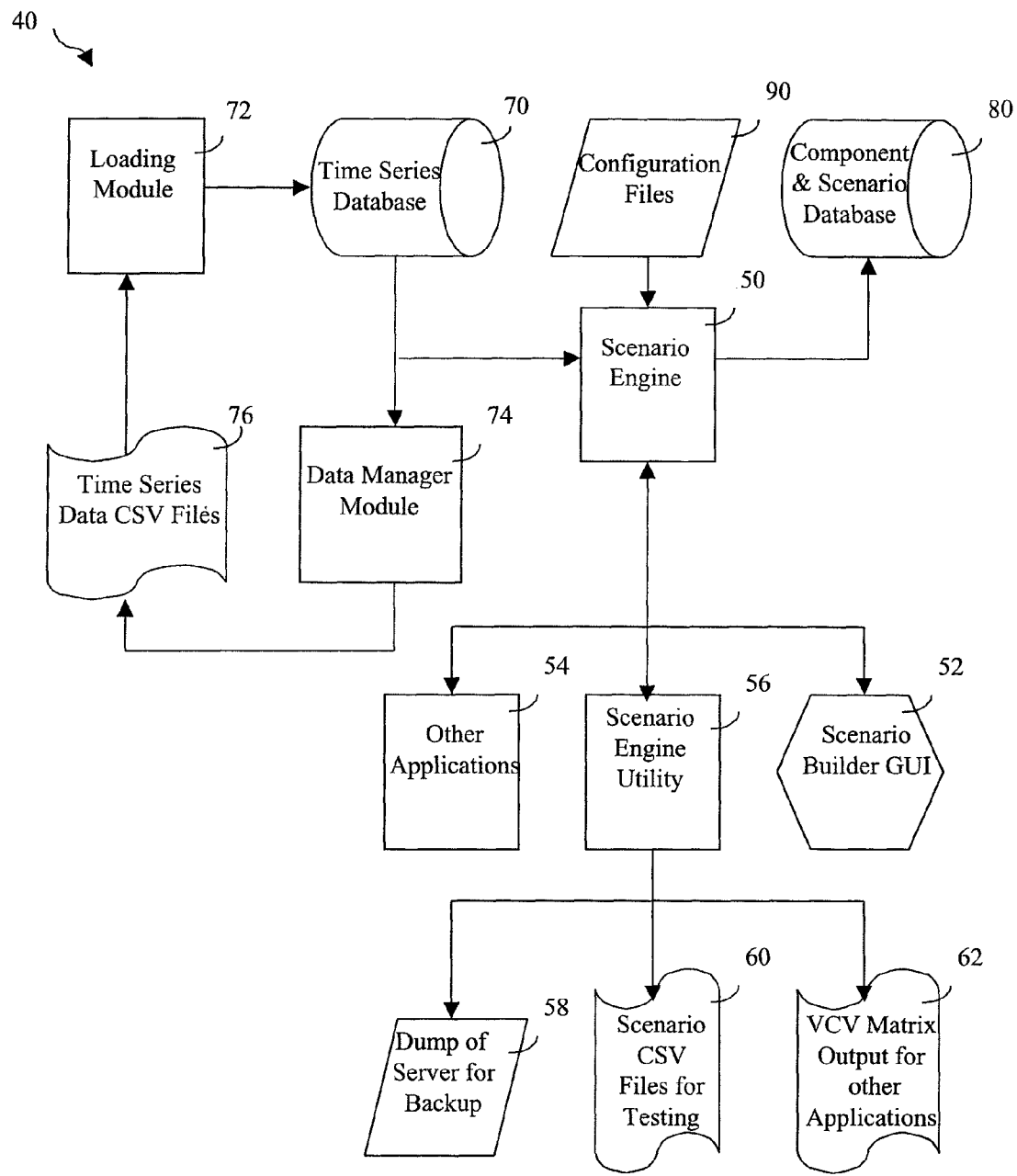
FIG. 3 is a schematic diagram illustrating a system for generating scenarios designed in accordance with an embodiment of the present invention.

Referring to FIG. 3, a schematic diagram illustrating a system for generating scenarios designed in accordance with an embodiment of the present invention and shown generally as 40 is provided.

Scenario generation system 40 includes a scenario engine 50, which exists as a server. Scenario engine 50 runs on a machine (e.g. UNIX, Linux), and is responsible for all scenario generation, storage, and definition tasks. Scenario engine 50 receives requests from a scenario builder graphical user interface (GUI) 52, and optionally, other applications 54 or a scenario engine utility 56.

Scenario builder GUI 52 is a Java-based graphical interface. All components needed to create a scenario set (as will be described in further detail later in this specification) are specified using scenario builder GUI 52.

Scenario generation system 40 includes a scenario engine utility 56 that is designed to allow users to access certain types of information directly from scenario engine 50. For example, scenario engine utility 56 may be used to shut down scenario engine 50, import and export component definition files [not shown], dump parameter settings 58 from scenario engine 50 to a file for problem resolution or backup, and save data associated with scenario sets 60 and variance-covariance (VCV) matrices 62 to comma-separated-variable (CSV) files.

Scenario generation system 40 includes a time series database 70, which is a user-defined database that contains historical time series data. A loading module 72 is a database management tool that allows new data to be added to time series database 70. This can be accomplished with the aid of a data manager module 74, which supplies time series data in the form of a CSV file 76 to loading module 72.

Scenario generation system 40 also includes a component and scenario database 80. Component and scenario database 80 is managed by scenario engine 50, which also populates component and scenario database 80. Component settings and scenarios sets are stored in component and scenario database 80.

Scenario generation system 40 may also include configuration files 90, and optionally, a configuration server [not shown]. These components allow scenario generation system 40 to be customized such that different users can identify their particular hardware, software, or risk management preferences.

Decision-Making Process for Creating Scenario Sets

Often, the first challenge for a user in generating scenarios is to determine what type of scenario set to generate. For example, the user needs to determine whether statistical or ad hoc (e.g. non-statistical) scenarios should be generated, and what model for statistical scenarios should be used or which type of stress or sensitivity scenario should be generated. Depending on the desired statistic or result, several options may be available. For example, VaR can be estimated from historical scenarios, single-step Monte Carlo scenarios or even multi-step Monte Carlo scenarios. In each case, there are benefits and drawbacks.

Historical scenarios may be thought of as involving less judgment than statistical scenarios, since no judgments on statistical distributions are made. In this sense, while historical scenarios provide impartial representations of historical risk factor distributions, the number of scenarios that can be produced may be limited by the amount of historical data that is available. Furthermore, historical scenarios include only events that have actually happened, and so they may not be representative of all events that could possibly happen in the future.

Monte Carlo scenarios overcome the obstacles faced by historical scenarios, but their use introduces new issues. Since Monte Carlo scenarios are derived from a statistical model in which the model uses samples from an assumed distribution for the risk factor or the residuals of the model, many samples (i.e., scenarios) may be required to adequately represent the model (assuming that the model itself accurately depicts reality). This increases the computation time required to evaluate the portfolio under Monte Carlo scenarios. The problem is further aggravated in the use of multi-step Monte Carlo scenarios, which introduce a dimension of time into the scenarios (i.e., the portfolio must be evaluated at not just one, but a number of time points or time steps).

The number and type of scenarios generated can have a significant impact on a resulting VaR estimate. As such, a decision to generate historical or Monte Carlo scenarios brings several additional issues into consideration. If historical scenarios are selected, one must determine how to translate history into relevant predictions for the future. The return calculation, if any, is meant to rescale historical values based on today's information. (Returns can be defined in many ways. Some common methods are to take the difference of the level or the natural log of the time series of the risk factor for example.) In addition, since the accuracy of the statistical results depends on the number of scenarios, making efficient use of the available historical data will typically be a significant concern. If Monte Carlo scenarios are selected, other issues may surface. For example, a user may need to ensure that two risk factors display the proper correlation when one has a normal distribution and the other has an empirical distribution. The combination of models to better reflect history, the calibration of the models, and the attempt to represent an entire (continuous) distribution with a limited number of scenarios are all important challenges. Accordingly, while the decision about which type of scenarios to generate in order to solve a problem is complex and multi-faceted, it is an important one.

In order to simplify the decision-making process, it should not be viewed as a response to the single question: "What scenarios are required?" Rather, scenario sets can be more easily constructed by first answering a series of simpler questions (also referred to as "key questions" in this specification).

Figure 4:
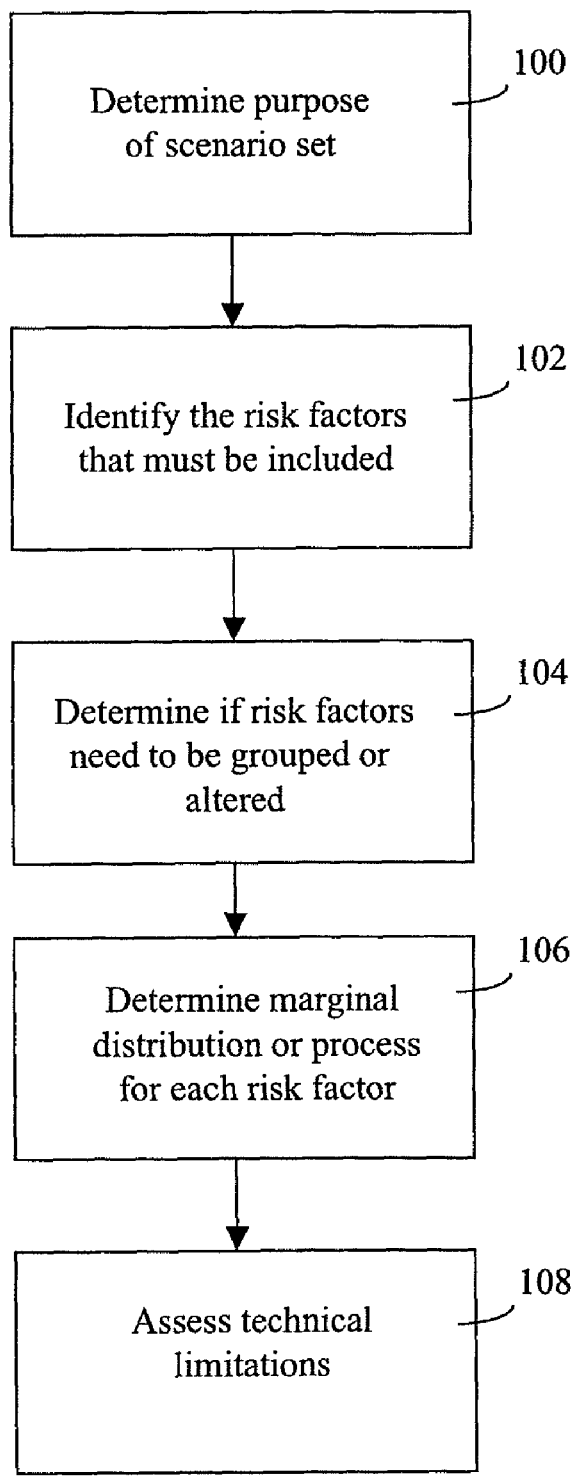
FIG. 4 is a flowchart illustrating the steps in the decision-making process for creating scenario steps in an embodiment of the present invention.

In an embodiment of the present invention, the responses to the following five questions provide an outline of the scenario set that is to be generated. Steps in the decision-making process for creating scenario steps are illustrated in the flowchart of FIG. 4.

1. What is the Purpose of the Scenario Set?

At step 100, the purpose of the scenario step is determined. The eventual use of the scenario set is critical in deciding how to create it. Historical or single-step Monte Carlo scenarios might be used to estimate VaR, while multi-step Monte Carlo scenarios may be more appropriate for calculating credit exposures.

2. What Risk Factors must the Scenario Set Include?

At step 102, the list of risk factors that affect a portfolio's value must be identified and analyzed. Proper understanding of the sources of risk and their quantification is essential to proper scenario modeling.

3. Do the Risk Factors need to be Grouped or Altered? If so, How Should it be Done?

In addition to listing risk factors, at step 104, one must decide whether the risk factors are acceptable in their current form, or whether they can be combined into smaller sets. For example, one technique for reducing the number of risk factors is principal components analysis.

4. What Marginal Distribution or Process is most Appropriate for each Risk Factor?

Once risk factors have been identified and the list analyzed for possible reductions or omissions, at step 106, the statistical properties of the risk factors are determined. The statistical representations chosen for each risk factor must be consistent with an overall approach to statistical scenario generation. For example, there are some consistency constraints on what sorts of models can be used with a particular codependent structure. For instance, all models must have a "normal" nature to use only a variance-covariance codependent structure, but a wider range of models could be used with a broader codependent structure such as normal correlations. Further details on the considerations associated with this step will be discussed in greater detail later in this specification.

5. What are the Technical Considerations, such as Run-Time or Memory?

At step 108, technical considerations must be assessed. This is an important practical question. The scenario set that fulfils the stated purpose must also be computationally tractable. Simulating the portfolio over the desired number of scenarios or trigger times may not fit into the processing time window. Different modeling decisions may reduce the number of scenarios required to achieve a specified accuracy, and, hence, allow the simulation to fit into the time window.

Answering the five questions above is only the first step in the scenario generation process. The potential for large numbers of risk factors and models, along with the need for flexibility and extensibility, makes implementing a system for generating scenarios a challenging task. The present invention provides for a framework that helps to structure and simplify this process. The framework is formalized and illustrated below.

Framework for Scenario Generation

The framework is based on a series of components. Each component is defined, and then the components are linked together to create a specific set of scenarios. A strength of the framework is its simplicity.

First, a name is associated with the scenario set that should indicate its usage (e.g. "A multi-step commodity and foreign exchange rate scenario for market and credit risk evaluation of the enterprise's commodity desks").

The scenario generation process itself is defined in several layers of abstraction. In a preferred embodiment of the invention, at the topmost level, there are only four main components. Four components is the minimum number to fully describe the scenario generation process in this embodiment of the framework. While a larger number of top-level components is possible, smaller numbers result in a greater level of abstraction. This permits easier communication of the purpose of the scenario. At the second level, each of the main components has, at most, three sub-components in this embodiment of the framework. This second level of detail is required to describe the scenario generation process in technical terms. Finally, the most detailed level includes a complete definition of each sub-component. This layered structure makes it easy to drill down into the details of the scenario generation process, while still providing context for the overall process.

Figure 5:
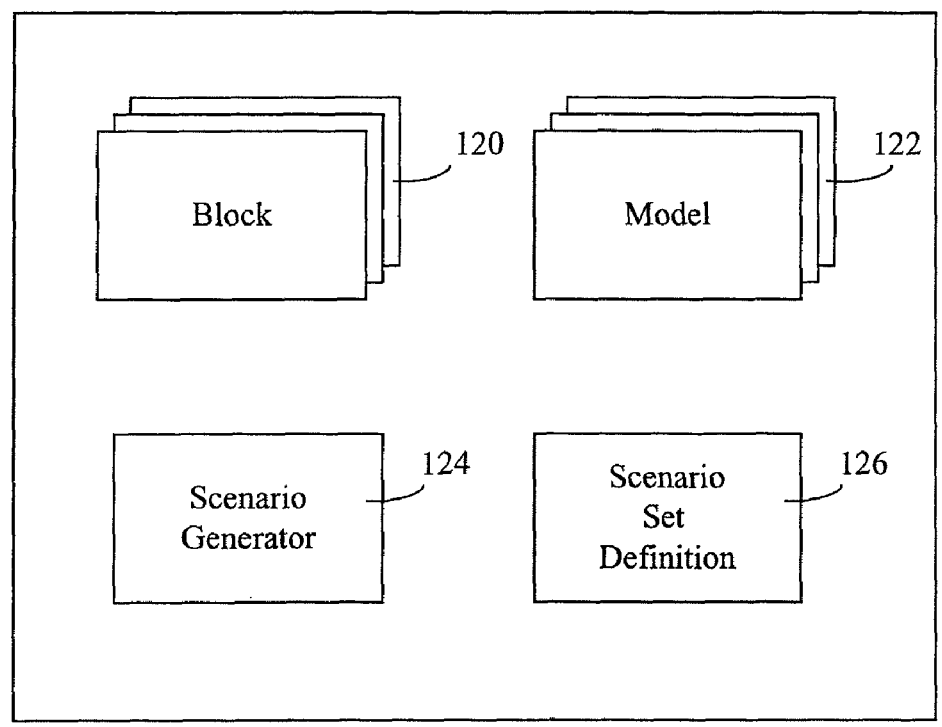
FIG. 5 is a schematic diagram illustrating the components of the framework for scenario generation at the topmost level of abstraction in an embodiment of the present invention.

Referring to FIG. 5, a schematic diagram illustrating the components of the framework for scenario generation at the topmost level of abstraction in an embodiment of the present invention is shown. At this level, the framework consists of four main components that are linked together to create a specific scenario set 110: Blocks 120, Models 122, a Scenario Generator 124 and a Scenario Set Definition 126. These components generally exist as data structures in implementations of the present invention, and a variety of methods of storing the associated data as known in the art may be used in variant embodiments.

As indicated earlier, a scenario set 110 consists of one or more scenarios, and is often interpreted as a set of possible future situations. More particularly, as detailed below, the scenario set 110 is a list of risk factors and their values at one or more points in the future that completely define a particular situation.

Blocks 120 are created from the set of risk factors affecting the portfolio under consideration. A Block 120 is basically a group of risk factors with similar statistical properties (e.g., all foreign exchange rates that mean revert). A Model 122 defines the distribution or evolutionary process for each risk factor, and also specifies a calibration method for obtaining all model parameters from historical (or other) data. Note that a Model 122 does not specify how risk factors are related to each other. The Scenario Generator 124 is a fully calibrated model for generating scenarios that link Blocks 120 and Models 122, and defines relationships among risk factors. Finally, the Scenario Set Definition 126 specifies the details of creating the actual scenario set 110, such as the number of scenarios, the trigger times (the future points in time that are of interest) and a description of the scenario set 110.

This top level of abstraction can be very useful in describing a scenario set 110 in non-technical terms. For example, the description of a sample scenario set "a multi-step Monte Carlo scenario set in which the interest rates mean revert and the equities grow, over time"—includes only the main components, as outlined in Table 1 below:

TABLE 1

Example of top-level framework components

| Main component | Related Description |
|---|---|
| Scenario Set Definition | "Multi Step" |
| Scenario Generator | "Monte Carlo" |
| Block one | "Interest rates" |
| Block two | "Equities" |
| Model one | "Mean reversion" |
| Model two | "Growth" |

Figure 6:
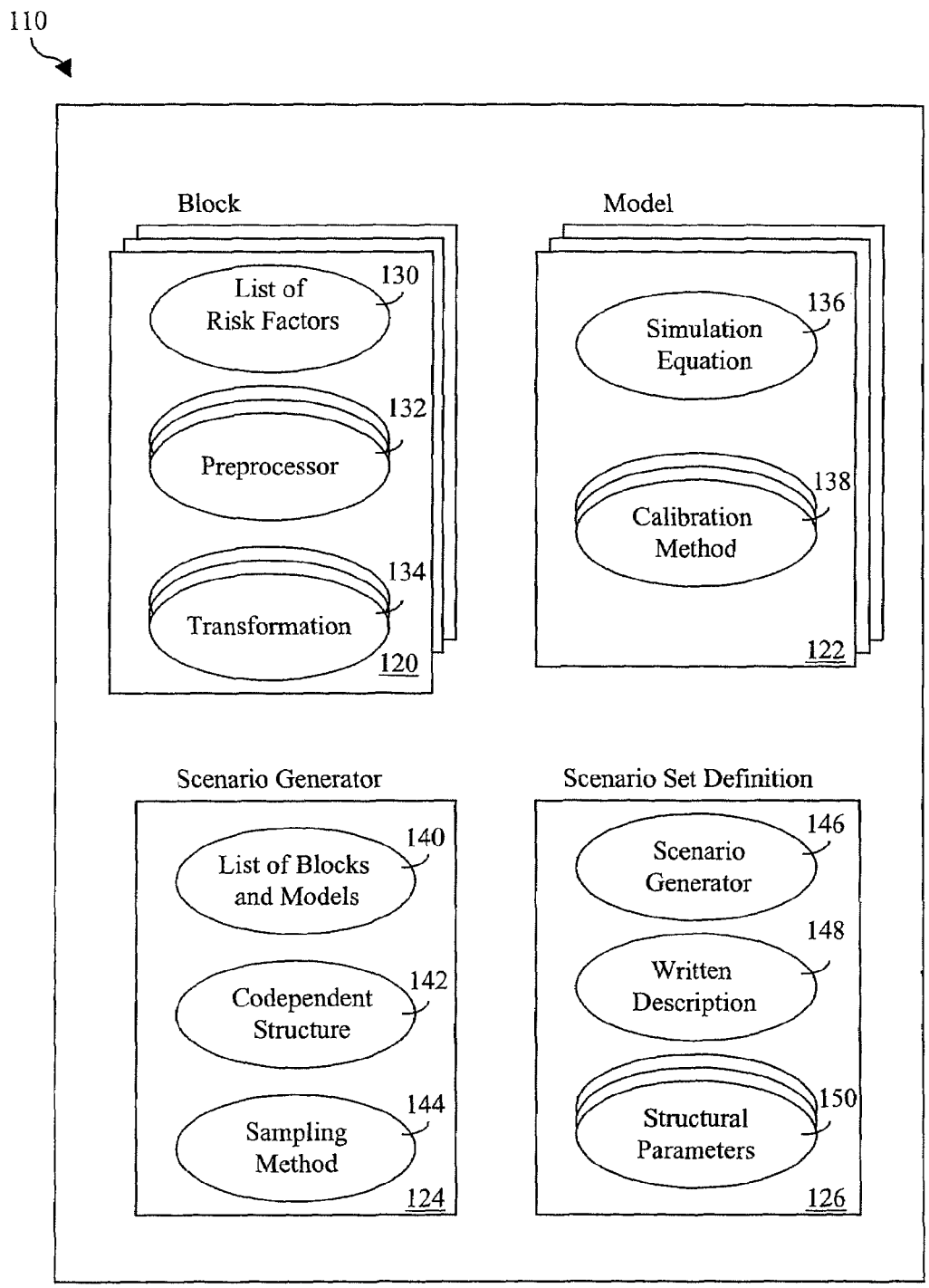
FIG. 6 is a schematic diagram illustrating the components of the framework for scenario generation at the second level of abstraction in an embodiment of the present invention.

Referring to FIG. 6, a schematic diagram illustrating the components of the framework for scenario generation at the second level of abstraction in an embodiment of the present invention is shown. FIG. 6 illustrates the second level of abstraction provided by the framework, which decomposes each main component shown in FIG. 5 into a set of up to three sub-components.

This second layer of detail is required to describe the scenario generation process in technical terms. As such, it includes sub-components for processing and transforming risk factor data, estimating model parameters, specifying the relationships (i.e., codependence) among risk factors and generating the actual scenarios in scenario set 110.

For example, the more detailed description of the scenario set "a multi-step Quasi Monte Carlo method using an equally weighted variance-covariance matrix for Canadian, American and Australian interest rates where each curve is represented by three components that mean revert, and American equities, adjusted for stock splits and distributions, that grow over time" includes both the main components of a scenario set 110, as shown in Table 1 above, and its sub-components, as shown in Table 2 below:

TABLE 2

Example of second-level framework components

| Sub-component | Related description |
|---|---|
| Codependent structure | "Variance-covariance" |
| Calibration method | "Equally weighted" |
| Sampling method | "Quasi Monte Carlo" |
| Transformations in the interest rate Blocks | "Three components" |
| Preprocessor in the equity Block | "Adjusted for stock splits and distributions" |

As is evident from these examples, the framework of the present invention provides a natural and standard structure for describing the scenario generation process to different audiences.

The framework itself does not address the issue of data directly. Although the availability of time series data facilitates the generation of scenarios, it is not an essential part of the framework. The required risk factor information, such as VCV matrices or reversion rates, for example, can be derived from time series data or obtained from external sources.

If desired, time series data may be tracked for each risk factor in a database, or some other suitable repository. In addition to raw data, the same database may contain information for categorizing risk factors. This information serves as the basis of the scenario generation framework. Data may be requested to identify a risk factor, estimate parameters of a Monte Carlo model, create historical scenarios, or to address other needs in generating scenarios. The decision concerning which risk factors to track over time depends on the answer to the second of the five key questions (as determined at step 102 of FIG. 4). For ease of exposition, in the following description of the framework components, it is assumed that there is a database containing time series data for all relevant risk factors.

Blocks (120)

A Block 120 defines a group of related risk factors that share similar statistical properties, and are often of the same type (e.g., interest rates). These may be the original risk factors, in which case a Block 120 is merely a grouping and data verification mechanism, or they may be complex functions of the original risk factors or underlying data, in which case the Block 120 is responsible for creating the new risk factors and estimating their histories. In addition to grouping risk factors, a Block 120 may also specify a set of operations to be performed on the risk factors by applying a transformation or a preprocessor (described in further detail below). The answers to the second and third key questions (as determined at steps 102 and 104 of FIG. 4) determine the number and characteristics of the Blocks 120.

List of Risk Factors (130)

All risk factors in a Block 120 are simulated using the same Model 122, so it is important that they share the same statistical properties. Grouping risk factors, rather than treating them individually, also has several advantages when discussing or describing a scenario set. For example, "US interest rates mean revert," or "European stock indices grow" or "Californian electricity forwards follow a jump diffusion" all refer to groups of risk factors. Blocks 120 allow these natural groupings to be carried into the description of scenario generation.

A further advantage of using Blocks 120 becomes apparent when adding risk factors. In this case, incorporating a new risk factor that is similar to existing ones simply requires adding the new risk factor to the list of risk factors 130 of the appropriate Block 120. All of the links to the Model 122 associated with a Block 120, and the methods for parameter estimation (e.g., VCV calculations) are specified at the level of Blocks 120 rather than for each risk factor individually.

The other main benefit of grouping risk factors is the ability to consolidate them into a smaller group of abstract risk factors. This represents a transformation, a sub-component of the Block 120 that is discussed further below.

Preprocessor (132)

A preprocessor 132 allows basic time series data from the database to be massaged or otherwise processed into useful information for production of the scenario set 110. For example, it is possible to track the high and low stock prices for the day in the database, and average them to get an estimate of the stock price for the day. A similar operation might involve the opening and closing stock prices or the bid and the ask quotes for foreign exchange rates. Separating the data collection and processing functions allows the precise use of the data to change when required. For example, tracking only the midpoint of the bid-ask spread limits the use of the data. In contrast, by tracking the bid and the ask prices separately, one can examine the midpoint, a weighted average, or the spread. This extra modeling freedom can be advantageous in risk management applications.

Other examples of preprocessors 132 include interpolation and data cleansing or checking routines. Rather than permanently updating the database with interpolated values, raw data can be stored and interpolation performed when necessary. Similarly, checks for outliers or negative values can be performed on demand.

Transformation (134)

Transformations 134 create abstract risk factors. An abstract risk factor is not directly observable in the market, but is usually created by combining the original risk factors in the list of risk factors 130 in some manner. For example, a principal components analysis transformation 134 is a VCV matrix-based technique that creates independent abstract risk factors (called principal components) by taking linear combinations of the original risk factors. The number of risk factors in the simulation can be reduced by retaining only those principal components that explain a significant amount of the VCV matrix. A reduction in the dimensionality of the simulation, combined with independence of risk factors, can significantly reduce the complexity of the modeling process.

Many transformations 134, other than principal components analysis, are possible. For example, an implied volatility surface might be represented by a set of equations. A transformation would then change the time series data for the surface into time series for the set of parameters of the equations. The set of possible transformations is limited to invertible functions. If a set of risk factors is transformed into a set of abstract risk factors, it must be possible to recover the original risk factors, although the recovery process may be approximate.

Model (122)

A Model 122 defines the future distribution or evolutionary process of a single (possibly abstract) risk factor in the list of risk factors 130 or Block 120. It does not account for any relations between risk factors, although all risk factors within a Block 120 are assigned the same form of marginal distribution. The answer to the first key question (as determined at step 100 of FIG. 4) determines the list of potential Models 122, while the answer to the fourth key question (as determined at step 106 of FIG. 4) refines this list to include only Models 122 actually used in generating the given scenario set 110. Model 122 includes both a simulation equation, and a method for calibrating it based on available information for each risk factor (usually historical data), described in further detail below.

Simulation Equation (136)

A simulation equation 136 provides a formula for the marginal distribution of a single risk factor at one or more points in the future. This formula is applied to all risk factors in the list of risk factors 130 of a given Block 120.

The evolution of a risk factor may be described by a discretized stochastic process. Common stochastic processes include Geometric Brownian Motion (GBM), mean reversion, jump diffusions and growth models. These types of processes have several desirable properties, most notably that the distribution of the risk factor at any point in time may be determined from the underlying process, and that the risk factors evolve in a consistent manner when examined at many points on the same timeline (i.e., the same scenario). Stochastic processes are commonly used in long-term simulations (i.e., periods of more than one month). The most significant drawbacks are that such processes typically assume that the risk factor values are normally or lognormally distributed at a given time, and that there is little or no autocorrelation of the risk factor values over time. Despite these issues, many portfolio credit risk and asset/liability measures are based on multi-step scenarios derived from stochastic processes.

Instead of evolving the risk factor through time, one may simply assume that the level of a risk factor at a specific time follows a certain distribution. This allows the use of a wider range of marginal distributions than those available from stochastic processes (in particular, empirical distributions based on historical data can be implemented). Unfortunately, the use of better-fitting marginal models often results in a lack of time evolution in a scenario set 110; by choosing the distribution at one point in the future, only that time point may be simulated. Single-step scenarios, typically used in VaR calculations, may be produced in this manner.

The choice of Model 122 or simulation equation 136 is a critical one; it determines how well the scenario set represents reality. Where a process that is to be simulated can be defined as either (i) the time series for a risk factor or block of risk factors, (ii) the transformed risk factor or block of risk factors, or (iii) the residuals or errors that result from modeling the risk factor(s) or transformed risk factor(s), then one desirable property of that process is stationarity. In a stationary process, the model describes the trend in the data, leaving a random component that fluctuates around a specific level (typically zero). The fluctuations themselves may or may not be of constant magnitude, but should show no discernible trend. In financial time series, returns (absolute or relative) are much more likely to be stationary than the rates themselves. For this reason, it is often preferable to model financial returns rather than financial prices.

Calibration Method (138)

A simulation equation 136 typically contains parameters that allow it to be tailored to individual risk factors. Usually, this tailoring requires a method 138 for estimating the parameters (i.e., calibrating the model) from historical data. Common calibration methods 138 include least squares estimates for simple linear regressions and, more generally, maximum likelihood estimators.

For example, suppose that a portfolio is exposed to the S&P 500 and the Nikkei 225 stock indices. Since both indices exhibit growth over time, a growth model for log returns is assigned to the Block 120 containing these risk factors in the list of risk factors 130. However, using historical data and a calibration method 138, it is determined that the S&P 500 grows at 5% per annum, while the Nikkei 225 grows only at 3.5% per annum (i.e., the parameter of the growth model is different for the two indices). Thus while the risk factors themselves have different growth historical rates, the scenario generation process can be simplified because the Block can be associated with only one Model. This is done by separating the calibration method for each risk factor within the Block from the Model.

Scenario Generator (124)

A Scenario Generator 124 is a fully specified, fully calibrated entity that can be used to generate scenarios for scenario set 110. It comprises three sub-components: a list 140 of Blocks 120 and Models 122, a codependent structure 142 and a sampling method 144. The decisions involved in defining these components are intertwined (e.g., the codependent structure 142 limits the types of Models 122 that may be selected for scenario generation). The Scenario Generator 124 completely describes the assumptions underlying a scenario set 110. For example, if a user assumes that interest rates mean revert and equities exhibit growth, then the Scenario Generator 124 will reflect this, as well as the speed with which interest rates revert, to which level they revert, and the growth rate of equities. In addition, the assumption about which risk factors are relevant, the time steps, and the relationships amongst risk factors are all embodied in the Scenario Generator 124. Answers to all five key questions (as determined in the steps of FIG. 4) influence the specification of a Scenario Generator 124.

List of Blocks and Models (140)

A Scenario Generator 124 associates a Model 122 with each Block 120. This is an essential conceptual step since it allows existing Blocks 120 and Models 122 to be combined in different ways to create different scenario generation models. For example, a Block 120 containing a set of foreign exchange (FX) rates might be associated with a mean reverting model in a multi-step Monte Carlo Scenario Generator 124, and with a lognormal model in a single-step Monte Carlo Scenario Generator 124.

Codependent Structure (142)

The codependent structure 142 anchors the components of the framework by defining the relations between risk factors in the list of risk factors 130 and specifying how these relations are incorporated into the sampling methods 144 to obtain scenarios. Defining a codependent structure 142 can be challenging because of its complexity, and the fact that it is closely integrated with many other parts of the scenario-generation process.

The simplest example of a codependent structure 142 is the VCV matrix of the risk factor returns. When the risk factors have a joint-normal distribution, the VCV matrix is sufficient to describe all of the relations between them. The risk factor correlations serve as the central input for translating random numbers into the required joint-normal distribution.

More complex codependent structures 142 might involve more sophisticated translations containing many steps, or require inputs other than a VCV matrix. For example, a historical codependent structure 142 specifies the relationship between risk factors by setting a common data period and time horizon for the returns. Returns on each risk factor are calculated over the same time period to produce a single instance or sample. Historical sampling methods draw from the resulting finite and discrete collection of instances to create scenarios that reflect the historical risk factor correlations.

Sampling Method (144)

The third sub-component of the Scenario Generator 124 is a sampling method 144. Several sampling methods are available to be chosen from, but only one sampling method 144 is chosen for each scenario set 110. Sampling method 144 is a technique for drawing, or sampling, from the distribution. More formally, sampling method 144 is a process for selecting a finite number of instances of a variate from its assumed or known distribution. This is usually done in two steps as follows: first, a sample from the continuous uniform distribution between zero and one (inclusive) is drawn; then a translation is applied to transform the uniform sample to one from the desired distribution (e.g., normal). Selecting the sampling method 144 is a key decision in the scenario generation process because it determines the efficiency of the scenario set. Efficiency refers to the number of scenarios that are required to achieve a certain accuracy, defined by a confidence interval, for a selected risk measure. Note that a scenario set 110 that is efficient for one measure (e.g., average P&L) may not be efficient for another (e.g., VaR).

The most common sampling method 144 is pseudo-random sampling. One such technique is the linear congruential generator, which uses an equation of the form $x_{i+1}=(ax_i+b)$ mod c to generate successive random numbers (a, b and c are suitable constants and the initial number $x_0$, is known as the seed). The simplicity, ease of implementation and resulting statistical properties make pseudo-random sampling a popular sampling method. However, this form of sampling may not always produce the scenario set 110 that most efficiently represents a distribution. Other alternative sampling methods as known in the art that may be more effective in this regard may be used, such as low-discrepancy sequences, stratified sampling and antithetic variates, for example.

Scenario Set Definition (126)

A Scenario Set Definition 126 contains the specifics of applying a Scenario Generator 124 to a particular problem. For example, a multi-step Monte Carlo Scenario Generator 124 may be applied to a variety of market risk and credit risk problems by selecting different trigger times (future points in time that are of interest) or numbers of scenarios. The answer to the first key question (as determined at step 100 of FIG. 4) is used to define the Scenario Set Definition 126. Scenario Set Definition 126 consists of three sub-components: a Scenario Generator identifier 146 of a Scenario Generator 124, a written description 148 of the scenario set 110 and the specifications of various structural parameters 150.

Scenario Generator Identifier (146)

Each scenario set 110 is created by a single Scenario Generator 124 specified by Scenario Generator Identifier 146. Scenario Generator Identifier 146 is stored in the Scenario Set Definition 126. The specified Scenario Generator 124 determines how the scenarios are generated, while the structural parameters 150 determine their form and number. Together, they produce a complete scenario set 110.

Written Description (148)

An important, non-technical part of the Scenario Set Definition 126 is the commentary or written description 148, provided by the creator or designer of scenario set 110, of the intended usage and context of the scenario set 110. This information allows others to understand the applications of the scenario set 110 in the proper context.

Structural Parameters (150)

The designer must also decide, in defining a scenario set 110, what form the scenarios are to take. Problem-specific parameters 150, such as the number of scenarios to be generated and the future times that are of interest, are specified in the Scenario Set Definition 126. In addition, parameters 150 for controlling the Scenario Generator 124 can be provided. For example, identifying the seed of a random number generator may help to ensure that the scenarios can be reproduced precisely.

Workflow Example

In preferred embodiments of the invention, the definition of components in the framework for creating a scenario set (e.g. scenario set 110 of FIGS. 5 and 6) need not be performed in any particular order. One can begin with the Scenario Generator 124 and work "top-down", in the sense that one starts with the highest level of abstraction and then fills in the details to define the scenario generation process. Alternatively, one can begin with the risk factors and work "bottom-up", in the sense that the details are specified first and the overall structure is defined later. The framework is meant to allow the definition of a scenario generation process, rather than to provide an explicit procedure for creating the process; it is a group of components, not a series of steps.

Accordingly, there are many approaches that a user of a scenario generation system designed in accordance with the present invention (e.g. scenario generation system 40 of FIG. 3) can use to create scenario sets. For example, the scenario generation system can be adapted to permit a user to build scenario sets starting at the risk factor level in the process illustrated in FIG. 7.

Figure 7:
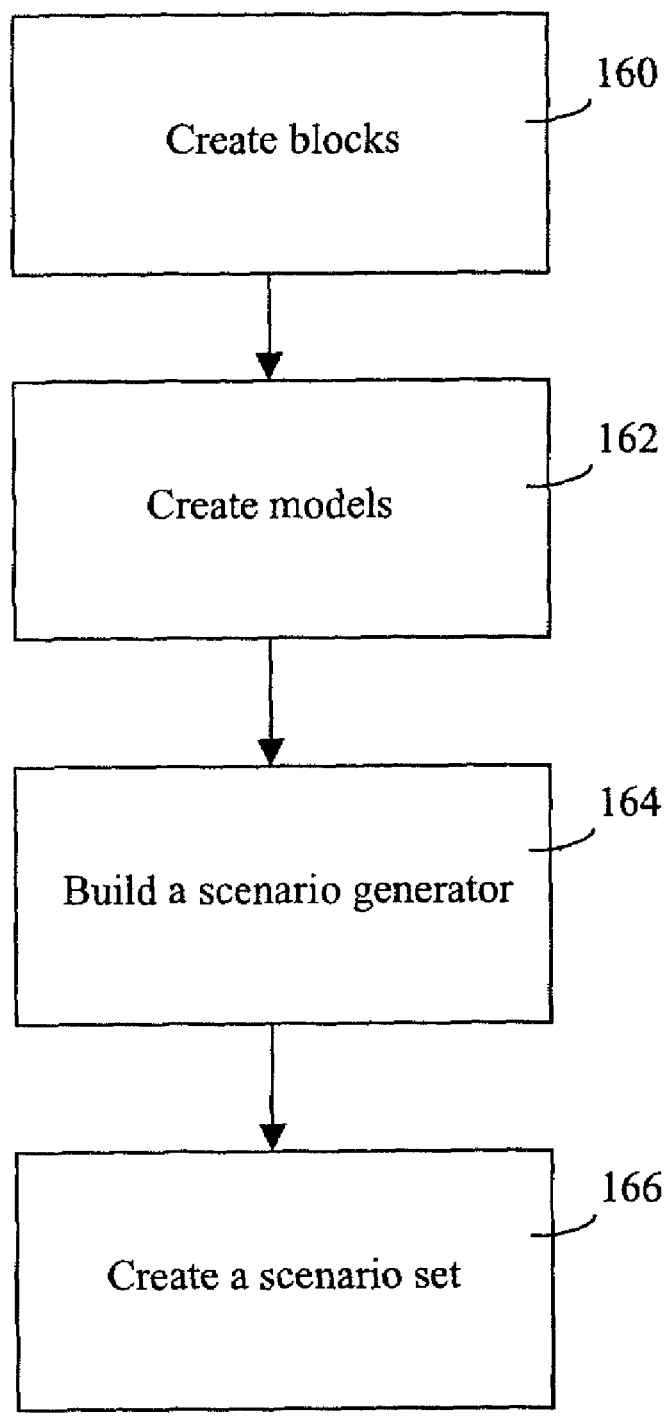
FIG. 7 is a flowchart illustrating the steps performed in an example process of building scenario sets using a scenario generation system designed in accordance with an embodiment of the present invention.

Referring to FIG. 7, a flowchart illustrating the steps performed in an example process of building scenario sets using a scenario generation system designed in accordance with an embodiment of the present invention is illustrated.

At step 160, a user creates Blocks (e.g. Blocks 120 of FIG. 6) by grouping risk factors that affect a portfolio under consideration to create a list of risk factors (e.g. List of risk factors 130 of FIG. 6). The manner in which risk factors are grouped is determined by the user. However, grouping should be created to facilitate some future operation (e.g. selecting a set of equities to be represented by principal components).

At step 162, the user creates Models (e.g. Models 122 of FIG. 6) that specify the simulation equation (e.g. simulation equation 136 of FIG. 6) and calibration methods (e.g. calibration methods 138 of FIG. 6) to be used in the simulation for the production of scenarios. Models should be created such that each Block can be linked to at least one Model.

At step 164, the user builds a Scenario Generator by associating Models and Blocks by choosing from a list of Blocks and Models (e.g. List of Blocks and Models 140 of FIG. 6) that has been created and stored, and specifying a sampling method (e.g. sampling method 144 of FIG. 6) and a codependent structure (e.g. codependent structure 142 of FIG. 6). This is an important step as it allows a user to specify how scenarios can be created automatically from a Model.

At step 166, a scenario set (e.g. scenario set 110 of FIG. 6) is created by sampling random numbers and using these, plus other structural parameters (e.g. structural parameters 150 of FIG. 6) to complete the description of how the risk factors evolve in the future. The scenario set is named and stored, and its parameters are assigned.

Figure 8:
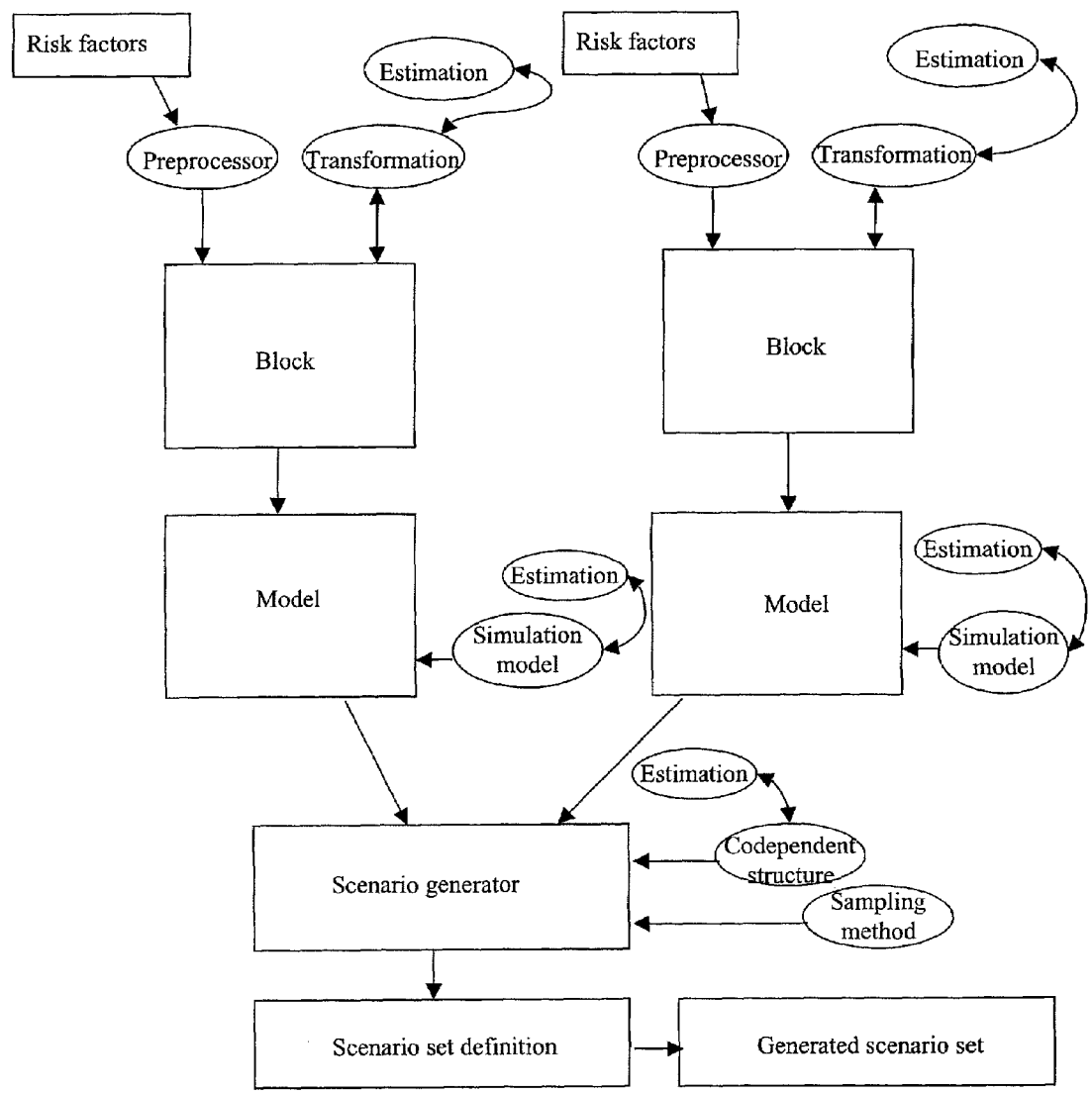
FIG. 8 is a schematic diagram of the flow of data being processed by the scenario generation system in the example process of FIG. 7.

Referring to FIG. 8, a schematic diagram of the flow of data being processed by the scenario generation system in an example of the process of FIG. 7 is illustrated.

Blocks, Models, and Scenario Generators, once they have been created, are reusable components. They can be used as they were created, or they can be modified and combined in different ways to generate new scenario sets. That is, they can be combined with other components to provide different results. As an example, an equity model can be defined as a growth model. By applying different calibration methods (e.g. the last year in one case, and a ten year history in the other), the same model can be used for different purposes (e.g. regulatory reporting or internal capital allocation) without redefining the model.

Other Benefits of the Framework

The framework of the present invention addresses some of the main issues in scenario generation: different audiences need information about scenarios; models are inherently complex; new models emerge and need to be incorporated; and large numbers of ever-changing risk factors must be managed. Some aspects of the framework that address these problems, and some of their corresponding benefits, are summarized in Table 3 below:

TABLE 3

Some aspects of the framework and some of their benefits

| Aspects | Benefits |
| --- | --- |
| Levels of abstraction | Manages large numbers of risk factors and complex models<br>Eases communication and understanding<br>Reduces perceived complexity |

TABLE 3-continued

Some aspects of the framework and some of their benefits

| Aspects | Benefits |
| --- | --- |
| Modularity and components | Allows the easy addition of risk factors<br>Facilitates adoption of new mathematical techniques (e.g. models, transformations, preprocessors) |
| Separation of model from risk factors | Facilitates reuse<br>Reduces duplication |
| Separation of marginal and joint distributions | Allows more modeling flexibility<br>Provides clearer model description<br>Facilitates reuse |
| Grouping of risk factors into Blocks | Simplifies reassignment of models<br>Provides an important abstraction when the number of risk factors is large |

The framework naturally provides several layers of abstraction: a description of its main components (see FIG. 5); a more detailed description including the sub-components (see FIG. 6); and a full description, including the details of each component. These levels of abstraction facilitate communication by allowing audiences to focus on the most appropriate level of information.

Abstraction is essential when attempting to deal with thousands of risk factors. Dealing with each one individually may be infeasible, but, by grouping risk factors, a tractable solution may be found. The complexity of each model can also be abstracted by using the framework. This allows greater accessibility to the generation process, while providing the technical details to those who require them.

The modularity of the framework promotes that reusability of components, which may be defined once and used repeatedly. The exchangeable nature of components in the framework allows for new models or risk factors to replace existing ones without disrupting the overall process.

Separating the model from the risk factors to which it applies permits a flexible implementation. Namely, a model can be easily applied to other risk factors, which promotes reuse and reduces duplication.

The separation of the marginal distributions from the joint distribution is a conceptual one. In fact, any combination of marginal models must be consistent with the joint distribution. This is a significant limitation, which must be considered at many stages of the scenario generation process. For example, based on the availability of codependent structures (i.e., joint distributions), it may be necessary to restrict the set of possible models. However, the conceptual separation of risk factor behaviour from risk factor interactions is advantageous, since it permits the reuse of marginal models across joint distributions, and allows for the two to be described separately.

The grouping of risk factors into Blocks allows a large number of risk factors to be managed effectively. It facilitates the addition of risk factors whose distributions are similar to those of existing risk factors (the new factor is simply added to the appropriate Block, with no other changes required). The grouping of risk factors allows them to be treated later as a single entity, which is an important abstraction. Finally, a Model may be associated with an entire set of risk factors rather than with each one individually, making it much easier to change from one Model to another.

Interaction of Framework Components

Figure 9:
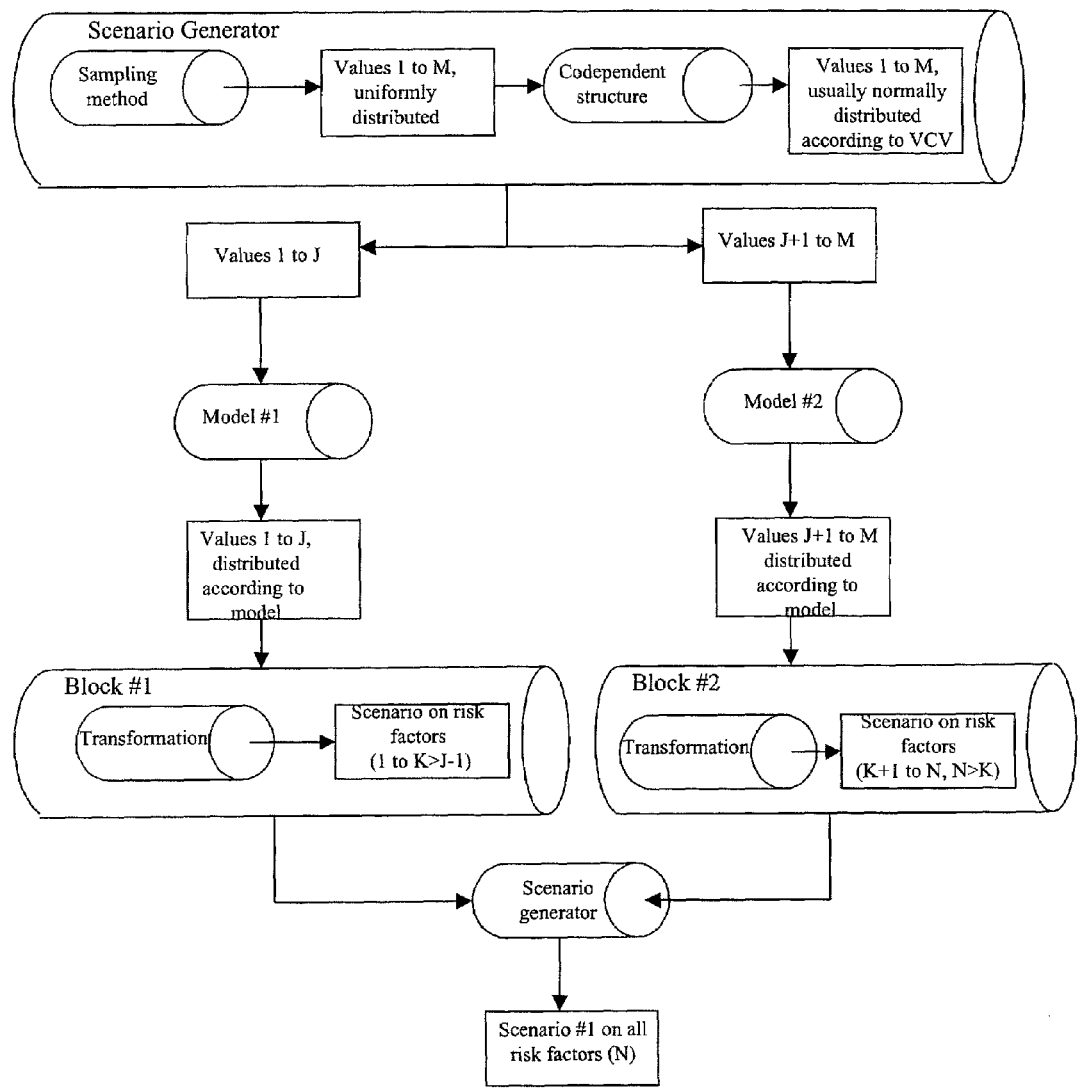
FIG. 9 is a schematic diagram illustrating the flow of data being processed in an example process of producing scenarios using a single-step Monte Carlo scenario generator.
Figure 10:
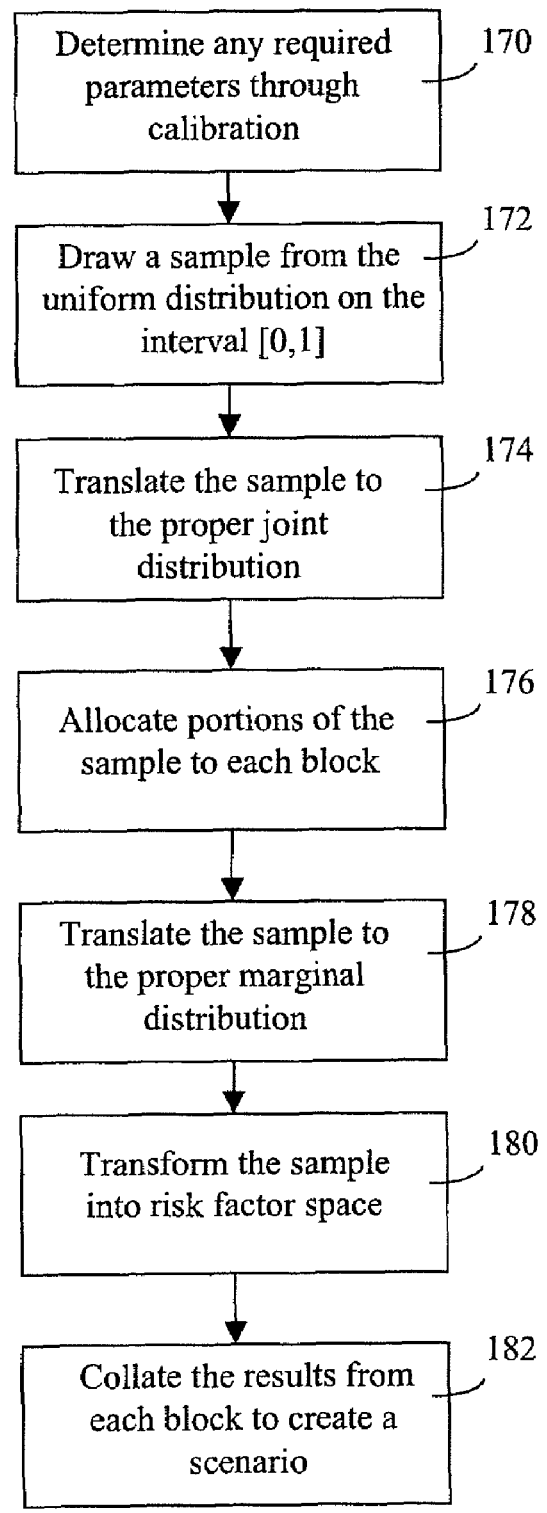
FIG. 10 is a flowchart of the steps in an example of the process of producing scenarios using a single-step Monte Carlo scenario generator.

To gain a better understanding of how the framework components interact, consider, for example, the case of a single-step Monte Carlo Scenario Generator. Suppose that there are two Blocks, each associated with a different Model, and that all of the components have been specified and calibrated as necessary. FIG. 9 is a schematic diagram showing the flow of data in an example of the process that produces the actual scenarios. The process of FIG. 9 can be viewed as consisting of seven steps, which occur in sequence, and which are illustrated in FIG. 10. Note that the sequence does not need to be followed when performing steps to create the components (e.g. Blocks, Models) themselves, which can be performed in any order.

Referring to FIG. 10, a flowchart of the steps in an example process of producing scenarios using a single-step Monte Carlo scenario generator is illustrated.

At step 170, any required parameters (e.g. the growth rate of market indices) are determined through calibration. This is described above in the generic framework with reference to FIG. 6 as 138. All components of the scenario set (e.g. scenario set 110 of FIG. 6) under the framework may need to be queried at this step.

At step 172, a sample from the uniform distribution on the interval [0,1] is drawn in accordance with a specified sampling method (e.g. sampling method 144 of FIG. 6).

At step 174, the sample is translated to the proper joint distribution with the use of a codependent structure (e.g. codependent structure 142 of FIG. 6).

At step 176, portions of the sample are allocated to each Block (e.g. Block 120 of FIG. 6) according to the Blocks defined in the Scenario Generator (e.g. Scenario Generator 124 of FIG. 6).

At step 178, the sample is translated to the proper marginal distribution in accordance with a simulation model (e.g. Model 122 of FIG. 6) represented by a simulation equation (e.g. simulation equation 136 of FIG. 6) and calibration methods (e.g. calibration methods 138 of FIG. 6).

At step 180, the sample is transformed into risk factor space in accordance with an appropriate transformation (e.g. transformation 134 of FIG. 6).

At step 182, the results from each Block are collated to create a scenario by the Scenario Generator using the information about the Blocks stored in the Scenario Generator.

Unlike the Single-Step Monte Carlo example described above, historical scenarios are drawn more or less directly from historical market data. When compared to Monte Carlo scenarios, historical scenarios are based on less restrictive assumptions and are often easier to explain. In fact, a typical process for generating historical scenarios is simple:

1. Track the risk factors over time. Determine the risk factors to use (e.g. stored in List of risk factors 130 of FIG. 6).
2. Use a historical codependent structure (e.g. Codependent structure 142 of FIG. 6).
3. Determine a time window to serve as the basis for the scenarios.
4. Calculate returns for the risk factors over the time window.
5. Use the returns to create scenarios (e.g. scenario set 110 of FIG. 6).

Methods used to create the scenarios from the collection of returns may be straightforward, or may approach the complexity of Monte Carlo techniques. An example of a historical scenario approach is scenario bootstrapping. Scenario bootstrapping is a common technique used to create statistical scenario sets. It is most useful when a medium-term time horizon is required, but only a limited amount of historical data is available. The method is based on the assumption that day-to-day returns are independent. For financial time series, this is usually not a bad assumption. It is consistent with the efficient market hypothesis and with the use of Brownian motion in multi-step Monte Carlo models. An example of how scenario bootstrapping works is provided in the following section.

Examples

The following examples illustrate the use of the framework of the present invention. The first example shows its application to bootstrapping historical scenarios for VaR calculation, while the second illustrates its application to the generation of multi-step Monte Carlo scenarios for credit exposure calculations. In both cases, it is necessary to simulate a large international portfolio containing a mixture of fixed income, equity and foreign exchange instruments and their derivatives to obtain the risk measure specified in each example. Analysis of the portfolio led to the identification of 4,210 individual risk factors spanning 28 countries and 6 risk factor classes. In the examples, three years of data were available for all risk factors, but only the last year of data was relevant to risk analysis.

From the information provided, the task of generating appropriate scenarios, for either historical VaR analysis or credit exposure calculations, appears daunting. The benefit of using the framework of the present invention is that it provides a structured approach to solving the problem. The examples begin by the answering of the five key questions (the answers are assumed to reflect the experience of a typical risk manager). Those answers are then used, in conjunction with the framework, to provide comprehensive and comprehensible descriptions of the scenario generation process.

Ten-Day Historical VaR

In this example, the goal is to calculate a 10-day historical VaR for the portfolio described above. First, the five key questions (i.e. the decision-making process for creating scenario steps of FIG. 4) are answered:

1. The purpose of the scenario set is to calculate a 10-day historical VaR.
2. All risk factors affecting the portfolio must be included in the scenario set.
3. The risk factors need not be grouped, but, in this case, grouping is beneficial since several risk factors share statistical properties. No transformations of the risk factors are required.
4. The daily returns for each type of risk factor need to exhibit stationarity (a suitable return process might be determined through statistical analyses of the risk factors, assumed from previous experience, or based on industry literature).
5. The technical constraints require that, in order to minimize run-time, the scenario set must be efficient for VaR calculations (i.e., it should contain just enough scenarios to accurately estimate VaR).

These answers help to identify an appropriate method for generating scenarios and also guide the construction of the various framework components. The following sections describe this process in greater detail.

Scenario Bootstrapping

Several techniques can be used to generate historical scenarios for calculating 10-day VaR. Perhaps the most straightforward method is to produce scenarios from disjoint 10-day periods in history. This avoids introducing correlations between scenarios, but if the amount of data is limited, it may be possible to obtain only a small number of scenarios (e.g., one year of data will produce about 25 scenarios). Conversely, one could use a rolling window approach, in which case two consecutive scenarios share nine days worth of data. This provides a larger number of scenarios (250 per year of data in this case), but the scenarios show a high degree of autocorrelation, which reduces the accuracy of the VaR estimate.

Scenario bootstrapping is a more sophisticated technique that is most useful when scenarios must span a relatively long horizon (e.g., 10 days), but only a limited amount of historical data (e.g., one year) is available. Scenario bootstrapping repeatedly samples daily changes (i.e., returns) in the risk factors in order to construct a scenario spanning a longer time horizon. In this case, a scenario of 10-day changes in risk factor levels is obtained by randomly selecting 10 daily changes from the past year and calculating their cumulative effect. The method assumes that day-to-day returns are independent, which is generally reasonable in practice. Although many financial time series do exhibit some degree of autocorrelation, the assumption that daily returns are independent is consistent with the efficient market hypothesis and the use of Brownian Motion in multi-step Monte Carlo models.

Blocks

In order to define the Blocks, the 4,210 risk factors are broken down in a logical fashion. This task proceeds in three stages as follows. First, each risk factor is assigned to a broader class, such as interest rates, foreign exchange rates, equities and several types of implied volatilities. Next, risk factors within a class are broken down by region. Typically, an international portfolio is subdivided into its regional components for management purposes, and so the division of risk factors by region is also quite natural. Finally, certain risk factors (called points) are grouped together to form logical curves for interest rates or logical surfaces for implied volatilities. This groups the 4,210 individual risk factors into only 676 composite risk factors as shown in Table 4 below, each of which is then modeled separately:

TABLE 4

Breakdown of risk factors by class and currency

| Risk factor class | Geographical region | Description |
|---|---|---|
| Interest rates | North America | Two curves per currency; 25 points per curve; two currencies |
| | Europe | One curve per currency plus the Euro swap curve; Average 15 points per curve; 15 currencies |
| | Asia-Pacific | One curve per currency; 18 points per curve; Seven currencies |
| | South America | One curve per currency; eight points per curve; Four currencies |
| Foreign exchange | All | Against USD; 28 in total |
| Equity indices | North America | 195 sector indices; 180 in USD; 15 in CAD |
| | Europe | 25 Euro-sector indices; 25 GBP sector indices |
| | Asia-Pacific | 15 sector indices per currency; seven currencies |
| | South America | One equity index per currency; four currencies |

TABLE 4-continued

Breakdown of risk factors by class and currency

| Risk factor class | Geographical region | Description |
|---|---|---|
| Implied volatility - interest rate | North America | Swaption, cap and floor curves in USD; 25, 16 and 16 points, respectively |
| | Europe | Swaption, cap and floor curves in EUR; 25, 16 and 16 points, respectively |
| | Asia-Pacific and South America | None |
| Implied volatility - foreign exchange | All | 250 surfaces; average 12 points per surface |
| Implied volatility - equity | North America | Surfaces for five main indices; 36 points per surface |
| | Europe | Surfaces for two main indices; 36 points per surface |
| | Asia-Pacific and South America | None |

Table 5 contrasts the number of risk factors in each class before and after the grouping (into logical curves and surfaces). An analysis of the risk factors (discussed below under the Models heading) indicates that all risk factors in the same class have the same return type. In this case, it is sufficient to have one Block for each class of risk factor. Specifically, the Blocks are: Interest Rates (IR), Foreign Exchange (FX), Equity Indices (EQ), Implied Volatilities—IR, Implied Volatilities—FX, and Implied Volatilities—EQ:

TABLE 5

Effect of logical grouping on numbers of risk factors

| Risk factor class | Number of risk factors | Number of points |
|---|---|---|
| Interest rates | 31 | 498 |
| Foreign exchange | 28 | 28 |
| Equity indices | 354 | 354 |
| Implied volatilities - IR | 6 | 114 |
| Implied volatilities - FX | 250 | 3,000 |
| Implied volatilities - EQ | 7 | 216 |
| TOTAL | 676 | 4,210 |

For all Blocks, the historical data requires preprocessing to ensure valid results. For instance, outliers are removed and linear interpolation is used to fill in any missing time series information. Note that the return type for the Foreign Exchange Block is logarithmic (see Table 6 below). Since one cannot take the logarithm of a negative number, an extra preprocessor is added to this Block to check for negative values. Negative values are removed and treated as missing data. As is typical of historical scenarios, no transformations are selected in the Blocks. The following table illustrates return types by risk factor class in this example:

TABLE 6

Return types by risk factor class

| Risk factor class | Return type | Calculation |
|---|---|---|
| Interest rates | Basis point shift | $X_s = X_t + 10000 * \{(X_i - X_{i-1})/10000\}$ |
| Foreign exchange | Logarithmic change | $X_s = X_t * \exp(\log(X_i/X_{i-1}))$ |
| Equity indices | Percentage change | $X_s = X_t * (X_i/X_{i-1})$ |
| Implied volatilities - IR | Historical value | $X_s = X_i$ |
| Implied volatilities - FX | Absolute change | $X_s = X_t + (X_i - X_{i-1})$ |
| Implied volatilities - EQ | Percentage change | $X_s = X_t * (X_i/X_{i-1})$ |

Models

Since scenario bootstrapping combines random daily returns, it is important that the daily returns for each risk factor be stationary over the period for which data is available. To achieve this, the manner of calculating daily returns varies depending on the risk factor. In this case, a separate Model is associated with each type of daily return.

Formally, let $X_t$ denote the risk factor value at the current time t and let X denote the risk factor value at some previous time i. The risk factor value Xs in scenario is then calculated as shown in Table 6, in a manner consistent with the statistical properties of its respective class. For example, equity indices tend to change substantially in value over time, which makes many return types non-stationary. The choice of percentage change returns, in contrast, is relatively stationary for most equity indices.

From Table 6, it follows that five Models for return calculations can be created. Note that each Model specifies only the return type; the time horizon and data periods for all risk factors are specified simultaneously in the codependent structure, as described in the following section.

Scenario Generator

In this example, Models are assigned to Blocks as indicated in Table 6, recognizing that Blocks and Models correspond to risk factor classes and return types, respectively.

Since scenarios are constructed by sampling actual daily returns for all risk factors simultaneously, a historical codependent structure is obtained. That is, the correlation between the changes in risk factors in the scenario set is directly determined from the historical data, since risk factor changes that coincided in the past are replicated in the scenario set. This example assumes that the historical data is taken from the one-year period between Oct. 1, 2000 and Sep. 30, 2001. Note, also, that scenario bootstrapping uses a one-day time horizon for return calculations, even though 10-day VaR will be estimated. Approximately 250 one-day returns are available since the returns of all risk factors are calculated from the same one-year period, and there are approximately 250 business days per year.

The sampling method is random, from a uniform distribution, with replacement. This means that a pool containing the 250 one-day returns (for all risk factors) is created. For each scenario, 10 daily returns are drawn from the pool and accumulated to obtain a 10-day return. All returns in the pool are equally likely to be selected and, since sampling occurs with replacement, the pool always contains the same number (250) of returns.

Scenario Set Definition

The Scenario Set Definition specifies the future dates that are of interest and the number of scenarios to be created. Since the objective is to obtain the 10-day VaR, a set of representative portfolio values is required at a single date only, 10 days in the future. The required number of scenarios depends in a large part on the level at which VaR is to be calculated, and on the desired accuracy of the estimate. Assuming the 95% VaR is to be calculated, for instance, 500 scenarios may be deemed to provide sufficient accuracy. Finally, a description of the scenario set helps to explain its applicability. In this case, "500 bootstrapped scenarios from one year of data for calculating a 10-day historical VaR for the portfolio" is adequate for this purpose.

Note that the framework does not address issues such as the pricing of the portfolio under each scenario 10 days into the future, and the details of estimating 95% VaR. The scenario engine of the present invention can pass the scenario to a pricing engine to perform such tasks.

Credit Exposures

Now, suppose that the objective is to assess the credit riskiness of the portfolio on an annual basis for the next 10 years. This requires evolving risk factors over time in a consistent fashion. Since there is clearly insufficient historical data available in this case, multi-step Monte Carlo scenarios are appropriate for addressing this problem. This example, which illustrates a typically Monte Carlo model, again begins by answering the five key questions:

1. The purpose of the scenario set is to estimate credit exposures over a long time horizon.
2. All risk factors shown in Table 4 must be included in the analysis.
3. As indicated in the answer to the fifth key question, the number of risk factors needs to be reduced. Principal components analysis (PCA) and functional approximations are effective solutions to this problem.
4. Interest rates, foreign exchange rates and equity indices must each evolve over time according to an appropriate stochastic process. Moreover, interest rates and FX rates display mean reversion, while equity indices tend to grow over time. Implied volatilities of all types are assumed to be distributed randomly over time, but must remain positive.
5. One of the basic inputs to the Monte Carlo model is the VCV matrix. In this example, the VCV matrix fits into the framework as part of the calibration of the codependent structure.) In this example, the number of risk factors in the overall VCV matrix exceeds the time allotted to scenario generation in the overnight process. Unlike the previous example, which did not require the calculation of a VCV or the retention of many time steps per scenario, the number of risk factors is too high to make the proposed scenario set practical. To overcome the constraint of the time allotted to the overnight process requires transformation of the Blocks to make the problem more manageable.

Blocks

Partitioning the risk factors into Blocks and applying proper transformations are the keys to reducing the number of risk factors. Again, the first step in the process is the classification of the risk factors (Table 4). While it is natural to use the same breakdown as in the previous example, other classifications are also possible. The breakdown of the entire list of risk factors into Blocks is guided by knowledge of the nature of the risk factors. Here, the assumption is that all risk factors within a class exhibit similar time series properties. In fact, many sub-classes could exist. For example, it is possible to model risk factors from emerging markets differently from those relating to more established markets. Transformations can be used to reduce the number of points in composite risk factors. PCA is generally appropriate when applied to interest rates curves and FX-implied volatilities. Alternatively, functional representations of EQ-implied volatilities and IR-implied volatilities may be considered acceptable in long-term simulations such as the current example.

Interest Rate Blocks

Preprocessing requirements for interest rate Blocks include interpolation, extrapolation and the elimination of both negative rates and negative forward rates. Other issues of data integrity can also be addressed at this stage of the scenario generation process. Historical data, while not used to produce scenarios directly as in the previous example, is still important for the calibration of the Monte Carlo models.

Replacing each interest rate curve with its three most significant principal components reduces the number of interest rate risk factors in the simulation from 498 to 93. To accomplish this, one Block is created containing each interest rate curve (note that grouping several interest rate curves into a single Block is not possible where curve-by-curve PCA is required). A PCA transformation, calibrated with an equally weighted VCV matrix based on one year of data, is applied to each Block. The VCV matrix needs only to include the risk factors in the Block; correlations between different interest rate curves are of no interest in the PCA process. It is then necessary to model the evolution of the three abstract risk factors for each of the 31 interest rate Blocks.

FX Block

A single Block is created for all 28 exchange rates. It is not necessary to perform any transformations in this case. Since daily returns of foreign exchange rates are lognormally distributed, preprocessors are used to filter extraordinary data, interpolate for missing values, calculate the average of the bid and ask prices to be used as the value or the risk factor used for scenario generation, and check for negative values, which are removed and replaced by interpolated amounts. This preprocessing allows for more accurate model calibration in the scenario-generation process.

Equity Blocks

Separate Blocks are created to contain each of the North American, South American, European and Asian-Pacific equity indices. Risk factor data for all Blocks are preprocessed to remove outliers and interpolate missing values. Since 300 of 354 indices originate in North America or Asia-Pacific, PCA is performed on each of these two Blocks. For exposition purposes, it is assumed that each Block can be represented in terms of 12 abstract risk factors (i.e., principal components).

Implied Volatility Blocks

Each of the 263 implied volatility surfaces is assigned its own Block, and standard preprocessing removes outliers and interpolates missing values. A transformation is applied to each Block in order to reduce the number of risk factors. PCA is used to represent FX implied volatility surfaces in terms of two abstract risk factors, thereby reducing the number of associated risk factors from 3,000 to only 500. For interest rate and equity implied volatilities, a functional transformation requiring two and three parameters, respectively, is used to parameterize each volatility surface. The parameters effectively become the abstract risk factors that must be simulated.

The above transformations reduce the number of risk factors from 4,210 to 732 (see Table 7 below). This represents an 82% decrease in the number of risk factors, and a 97% decrease in the size of the VCV matrix required to implement the codependent structure. Note that the largest VCV matrix that was required to perform PCA was of size 195 by 195 (for the North American equity indices). The resulting computational effort in calculating the principal components is insignificant in comparison to the overall savings in calculations. The following table illustrates the number of abstract risk factor points by risk factor class in this second example:

TABLE 7

Number of abstract risk factor points by risk factor class

| Risk factor class | Number of abstract risk factors (points) |
| --- | --- |
| Interest rates | 93 |
| Foreign exchange | 28 |
| Equity indices | 78 |
| Implied volatilities - IR | 12 |
| Implied volatilities - FX | 500 |
| Implied volatilities - EQ | 21 |
| TOTAL | 732 |

Models

The evolution of risk factors is determined by appropriate stochastic processes in this example. Foreign exchange rate returns mean revert and follow a lognormal distribution. The process is calibrated using least squares estimates for the rates and levels of reversion based on two years of historical data.

Interest rate returns also mean revert and are lognormally distributed. However, by performing PCA, normally distributed principal components were created (they also mean revert). The normal mean reverting process for the principal components is calibrated using maximum likelihood estimates for the rates and levels of reversion based on three years of historical data.

Equity indices grow over time and are typically lognormally distributed. Growth rates are estimated using the least squares estimates of the slope of the log value of the index based on three years of data.

Principal components used to represent the North American and Asian equity indices are modeled using a normal distribution plus a growth component. Calibration similar to that for the natural equity index model is employed.

Implied volatilities are randomly distributed through time, without any visible trend. A Brownian Motion model is created for the foreign exchange implied volatility principal components. The parameters derived for both interest rate and equity implied volatility are found to be lognormally distributed, and a Geometric Brownian Motion model is created for these risk factors. These models have no parameters beyond the VCV matrix that is calculated as part of the codependent structure calibration.

Scenario Generator

The Scenario Generator associates Blocks and Models as indicated in Table 8. The codependent structure is a simple VCV matrix of dimensions 732 by 732 calculated on an equally weighted basis over three years of data. Pseudo-random sampling is used to produce 10 annual samples for each scenario. FIG. 9 shows the flow of the random samples through the other components of the framework to produce a scenario. The steps of scenario generation are similar to those outlined in FIG. 10 for the single-step Monte Carlo case. The following table identifies associated Blocks and Models for this second example:

TABLE 8

Blocks and Models

| Block (by risk factor class) | Model |
| --- | --- |
| Interest rates | Normal with mean reversion |
| Foreign exchange | Lognormal with mean reversion |
| Equity indices (North American and Asian) | Normal with growth |
| Equity indices (European and South American) | Lognormal with growth |
| Implied volatilities - IR | Geometric Brownian Motion |
| Implied volatilities - FX | Brownian Motion |
| Implied volatilities - EQ | Geometric Brownian Motion |

Scenario Set Definition

Suppose that 1,000 scenarios are judged to be sufficient for calculating the credit exposure to each counterparty. In this case, the Scenario Set Definition specifies that 1,000 scenarios are to be generated for all possible risk factors at annual trigger times for a 10-year period. A suitable description of the resulting scenario set might be "1,000 annual scenarios for 10 years based on multi-step Monte Carlo processes specific to each type of underlying factor."

Other Considerations

It will be obvious to those skilled in the art that there are numerous possible configurations of the scenario generation system without departing from the scope of the present invention. Furthermore, it will be obvious to those skilled in the art that the execution of various tasks associated with the present invention need not be performed by the particular component specified in the description of the preferred and variant embodiments of the invention described herein. For example, the performance of tasks by a scenario engine may be performed by a different engine or module, or by multiple modules. As a further example, information stored in the databases of the scenario generation system may be stored in a single database, or distributed across multiple databases or other storage means.

The present invention has been described with regard to preferred embodiments. However, it will be obvious to persons skilled in the art that a number of other variants and modifications can be made, without departing from the scope and spirit of the invention defined in the claims appended hereto.

The invention claimed is:

1. A computer-implemented system configured to generate risk factor scenarios in a risk management application, said system comprising:

a processing device;

a scenario builder graphical user interface configured to receive user input;

a data storage device comprising at least one database, said data storage device storing instructions which, when executed by said processing device, causes said processing device to:

receive user input at said scenario builder graphical user interface, wherein said user input identifies a plurality of risk factors affecting a portfolio under consideration, wherein each of said plurality of risk factors comprises an observable economic variable whose value or change in value translates into a change in a value of said portfolio under consideration, and wherein each of said plurality of risk factors is assigned to a risk factor class;

create a plurality of Block data structures in said data storage device;

store said plurality of risk factors in said plurality of Block data structures such that each of said plurality of risk factors is stored in one of said plurality of Block data structures, wherein risk factors stored in each Block data structure have similar statistical properties, wherein risk factors with similar statistical properties are assigned to the same risk factor class;

create at least one Model data structure in said data storage device, each Model data structure comprising data defining how values of risk factors with similar statistical properties change;

build a Scenario Generator data structure in said data storage device, said Scenario Generator data structure comprising a calibrated model configured to generate risk factor scenarios, wherein said calibrated model comprises: a list of blocks and models associating a Model data structure with each of said plurality of Block data structures, and a codependent structure defining relationships between risk factors of said plurality of risk factors;

and create a Scenario Set Definition data structure in said data storage device specifying how said Scenario Generator data structure is to apply to a user-specified risk management problem;

a scenario engine server configured to generate a scenario set for a plurality of risk factors, wherein said scenario engine server is configured to generate said scenario set by applying said Scenario Generator data structure, as specified by said Scenario Set Definition data structure, to a sampling of random numbers, wherein said generated scenario set comprises values of said plurality of risk factors at one or more future points in time, and wherein said scenario engine server produces one or more data files comprising data associated with said generated scenario set, which provides a monetary value associated with said portfolio under consideration.

2. The system as claimed in claim 1, wherein each data structure of said set of data structures comprises at least one subcomponent, and wherein said at least one subcomponent describes said scenario set at a lower level of abstraction.

3. The system as claimed in claim 2, wherein each Block data structure comprises a list of risk factors.

4. The system as claimed in claim 3, wherein each Block data structure further comprises at least one of a definition of a preprocessing routine or a definition of a transformation technique.

5. The system as claimed in claim 2, wherein each Model data structure comprises a definition of a simulation equation and at least one calibration method.

6. The system as claimed in claim 2, wherein said Scenario Generator data structure comprises a list of associated Block and Model data structures, and a codependent structure definition in which relationships between said Block and Model data structures are defined.

7. The system as claimed in claim 6, wherein said Scenario Generator data structure further comprises a sampling method definition.

8. The system as claimed in claim 2, wherein said Scenario Set Definition data structure comprises an identifier of a Scenario Generator data structure and definitions of a plurality of structural parameters.

9. The system as claimed in claim 8, wherein said Scenario Set Definition data structure further comprises a written description of said generated scenario set.

* * * * *

UNITED STATES PATENT AND TRADEMARK OFFICE
CERTIFICATE OF CORRECTION

| | | |
|---|---|---|
| PATENT NO. | : 8,204,813 B2 | Page 1 of 1 |
| APPLICATION NO. | : 12/547068 | |
| DATED | : June 19, 2012 | |
| INVENTOR(S) | : Merkoulovitch et al. | |

It is certified that error appears in the above-identified patent and that said Letters Patent is hereby corrected as shown below:

On the Title Page, item (54) and in the Specification, col. 1, line 1, Title, replace "SYSTEM, METHOD AND FRAMEWORK FOR GENERATING SCENARIOS" with -- GENERATING SCENARIOS --, and In the Claims:
Column 30, lines 18, 19 and 20, replace "at least one of a definition of a preprocessing routine or a definition of a transformation technique" with -- at least one of a definition of preprocessing routine and a definition of a transformation technique. --

Signed and Sealed this
Seventeenth Day of December, 2013

Margaret A. Focarino
*Commissioner for Patents of the United States Patent and Trademark Office*